(12) United States Patent
Bezanson et al.

(10) Patent No.: US 12,235,131 B2
(45) Date of Patent: Feb. 25, 2025

(54) SENSOR DEVICE FOR DETECTING TRANSPORT PARAMETERS AND METHOD OF MAKING THE SAME

(71) Applicant: Motryx Inc., Halifax (CA)

(72) Inventors: Andre Bezanson, Halifax (CA); Franziska Broell, Halifax (CA); Christopher Dail, Fall River (CA); Sunga Park, Halifax (CA)

(73) Assignee: Motryx Inc., Halifax (CA)

( * ) Notice: Subject to any disclaimer, the term of this patent is extended or adjusted under 35 U.S.C. 154(b) by 473 days.

(21) Appl. No.: 17/438,312

(22) PCT Filed: Mar. 11, 2020

(86) PCT No.: PCT/CA2020/050320
§ 371 (c)(1),
(2) Date: Sep. 10, 2021

(87) PCT Pub. No.: WO2020/181375
PCT Pub. Date: Sep. 17, 2020

(65) Prior Publication Data
US 2022/0187101 A1 Jun. 16, 2022

Related U.S. Application Data

(60) Provisional application No. 62/949,695, filed on Dec. 18, 2019, provisional application No. 62/821,169, (Continued)

(30) Foreign Application Priority Data

Mar. 14, 2019 (CA) ................................ CA 3036791
Mar. 20, 2019 (CA) ................................ CA 3037423

(51) Int. Cl.
*G01D 3/08* (2006.01)
*G01D 7/08* (2006.01)
(Continued)

(52) U.S. Cl.
CPC ................ *G01D 3/08* (2013.01); *G01D 7/08* (2013.01); *G01D 9/007* (2021.05); *G01D 15/28* (2013.01);
(Continued)

(58) Field of Classification Search
CPC ............ G01D 3/08; G01D 7/08; G01D 9/007; G01D 15/28; G01D 21/02; G01D 2207/30;
(Continued)

(56) References Cited

U.S. PATENT DOCUMENTS 4,989,462 A * 2/1991 Davis ..................... G01M 7/08
73/11.01
6,337,228 B1 * 1/2002 Juskey ................. H05K 1/0204
257/E23.105

(Continued)

FOREIGN PATENT DOCUMENTS

EP 3429344 B1 8/2020
WO 2017149468 A1 9/2017

OTHER PUBLICATIONS

Juliane Suchsland et al. "Evaluation of a fast single sample pneumatic tube system", (2011) Published 2014.
(Continued)

*Primary Examiner* — Matthew G Marini
*Assistant Examiner* — Leo T Hinze
(74) *Attorney, Agent, or Firm* — SMART & BIGGAR LP

(57) ABSTRACT

A sensor device for detecting transport parameters representative of those experienced by a sample during transportation is provided. The sample is stored in a container. The sensor device includes a housing with a configuration that generally matches the configuration of the container, a hardened substrate portion formed from a substrate material, and a sensor assembly comprising at least one sensor for detecting at least one transport parameter (e.g. acceleration, (Continued)

orientation, temperature, etc.). The sensor assembly is secured within the housing by the hardened substrate portion. Optionally, a weight of the device approximates a combined weight of the container and the sample stored therein. The weight of the sensor device can be adjusted. When the device is positioned proximate to the container during transportation, the at least one transport parameter detected by the at least one sensor is analogous to that at least one transport parameter experienced in the container.

20 Claims, 10 Drawing Sheets

Related U.S. Application Data filed on Mar. 20, 2019, provisional application No. 62/818,050, filed on Mar. 13, 2019.

(51) Int. Cl.
*G01D 9/00* (2006.01)
*G01D 15/28* (2006.01)
*G01D 21/02* (2006.01)

(52) U.S. Cl.
CPC ......... *G01D 21/02* (2013.01); *G01D 2207/30* (2021.05)

(58) Field of Classification Search
CPC ........... B01L 2200/12; B01L 2200/185; B01L 2300/024; B01L 2300/042; B01L 2300/0832; B01L 3/5453
See application file for complete search history.

(56) References Cited

U.S. PATENT DOCUMENTS

| | | |
|---|---|---|
| 7,637,868 B2 | 12/2009 | Saint et al. |
| 2004/0248106 A1 | 12/2004 | Leonard et al. |
| 2010/0032437 A1 | 2/2010 | Lossau |
| 2010/0049024 A1 | 2/2010 | Saint et al. |
| 2014/0022093 A1 | 1/2014 | Hubauer et al. |
| 2017/0372040 A1 | 12/2017 | Valerino |
| 2018/0093401 A1 | 4/2018 | Geiger |

OTHER PUBLICATIONS

Thomas Streichert et al. "Determination of Hemolysis Thresholds by the Use of Data Loggers in Pneumatic Tube Systems", Available: https://doi.org/10.1373/clinchem.2011.167932, Clinical Chemistry, vol. 57, Issue 10, Oct. 2011, pp. 1390-1397.

* cited by examiner

SENSOR DEVICE FOR DETECTING TRANSPORT PARAMETERS AND METHOD OF MAKING THE SAME

CROSS-REFERENCE TO RELATED APPLICATIONS

The present application is a national phase entry application of Patent Cooperation Treaty Application No. PCT/CA2020/050320, filed Mar. 11, 2020, which claims the benefit of priority from U.S. provisional patent application No. 62/818,050 filed Mar. 13, 2019; U.S. provisional patent application No. 62/821,169 filed Mar. 20, 2019; U.S. provisional patent application No. 62/949,695 filed Dec. 18, 2019; Canadian patent application no. 3036791 filed Mar. 14, 2019; Canadian patent application no. 3037423 filed Mar. 20, 2019, the contents of each of which are incorporated herein by reference in their entirety.

FIELD

This application relates to a sensor device for detecting transport parameters representative of transport parameters experienced by a sample positioned proximate the sensor device during transportation and to a method of making the same.

INTRODUCTION

The transportation of a sample from its point of collection to its point of testing may cause considerable harm to the sample. For example, the sample may be subjected to significant amounts of vibration during transportation or be subjected to extreme temperatures. Samples that are tested after being subjected to detrimental conditions during transportation may lead to erroneous and/or inaccurate results. These samples may be blood, urine or other biological samples where accurate test results are paramount to patient care.

A pneumatic tube system (PTS) may be used to efficiently transport samples, such as blood and urine, between different locations of a hospital or medical center. Use of the PTS may render samples unusable if the samples are subjected to levels of acceleration, pressure, temperature, and/or humidity that distort the sample. For example, if the transported sample is blood, the PTS may cause transport related hemolysis, which renders the blood sample unsuited for testing. Costs may increase if the samples have to be retaken or redrawn.

Trucks, cars, bicycles and other forms of transportation may also be used to transport samples between locations. For example, if the sample is transported by bicycle courier, it may be subjected to extreme temperature (e.g. if stored inside a backpack on a hot day) or high levels of acceleration (e.g. if the courier rides over rocky or uneven ground). The same detrimental conditions, or worse, may apply to samples that are transported in the back of a truck.

Individuals, such as lab technicians and the like, receiving the sample from couriers are often unaware of the environmental conditions and vibrational forces that the samples were subjected to during transportation. In some cases, visual inspection of the samples do not reveal damage. In other cases, there may be too many samples to inspect each one individually. These drawbacks are often compounded and can lead to a complex, inefficient, and/or costly pre-analytical process.

Drug and food products, e.g. pills, tablets, candies and the like, are often subjected to a coating and/or mixing process during manufacturing. For example, a pill is often coated in a protective film in a mixing drum. Mixing drums and conveyors used to mix and/or coat drug and food products may rotate at high speeds and/or operate at high temperatures to provide effective mixing. As a result, the drug and food products may be subjected to damaging environmental conditions and accelerations during the mixing and/or coating process. Damaged products are often thrown away which increases manufacturing cost. In some cases, packaging of the damaged products may lead to quality control issues.

There is considerable interest in use of data loggers to monitor objects during transport. A data logger has been tested in a pneumatic tube system in Streichert et al. (2011), "Determination of Hemolysis Thresholds by the Use of Data Loggers in Pneumatic Tube Systems", Clinical Chemistry, 57(10):1390-1397. Another example of a system attempting to monitor objects within a pneumatic tube system is found in Suchsland et al. (2014), "Evaluation of a fast-single sample pneumatic tube system". There remains a need for systems that better determine the parameters that affect an object in transport.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

The exemplary sensor devices described herein allow for the detection of the vibrations and environmental conditions that transportation networks impose on samples prior to analysis. The sensor device is configured (e.g. shaped and/or weighted) to emulate a container having a sample stored therein. The sensor device is positionable proximate the container during transportation. In this way, the sensor device will experience and be able to detect, for example, vibrations, orientation changes, and/or environmental conditions that are similar to those conditions experienced in the container during transportation.

In accordance with one broad aspect there is provided a device for detecting transport parameters representative of those experienced by a sample during transportation, the sample stored in a container, the device comprising: a housing with a configuration generally matching the configuration of the container; a hardened substrate portion formed from a substrate material; and a sensor assembly comprising at least one sensor for detecting at least one transport parameter, the sensor assembly being secured within the housing by the hardened substrate portion; wherein the device is positionable proximate the container during the transportation of the sample such that the at least one transport parameter detected by the at least one sensor is analogous to that at least one transport parameter experienced in the container.

In some embodiments, the at least one transport parameter is at least one of a temperature, a humidity, an acceleration, an orientation, a location, and a light intensity.

In some embodiments, the at least one transport parameter is detected either at periodic time intervals or continuously.

In some embodiments, the sensor assembly is fixedly secured within the housing by the hardened substrate portion.

In some embodiments, the sensor assembly is removably secured within the housing by the hardened substrate portion.

In some embodiments, the sensor assembly measures device transport parameters (for example, measured quantitatively or qualitatively), wherein the measured device transport parameters are representative of transport parameters experienced by the container.

In some embodiments, a weight of the device approximates a combined weight of the container and the sample stored therein.

In some embodiments, the weight of the device is about 80 to 120% of the combined weight of the container and the sample stored therein.

In some embodiments, the device is vial-shaped, optionally blood vial-shaped, and the weight of the device is about 14-18 grams, 15-17 grams or 16 grams.

In some embodiments, the weight of the device is about 90 to 110% of the combined weight of the container and the sample stored therein.

In some embodiments, the weight of the device is adjusted during forming of the device by adjusting a weight of the hardened substrate portion.

In some embodiments, the substrate material portion comprises, consists essentially of, or consists of an epoxy.

In some embodiments, the substrate material comprises an epoxy and a filler, the weight of the hardened substrate portion being adjusted during forming of the device by varying the relative weight proportions of the epoxy and the filler.

In some embodiments, the epoxy and the filler are in a homogeneous substrate mixture.

In some embodiments, the filler comprises at least one of glass microspheres, plastic microspheres, and silica.

In some embodiments, the weight of the hardened substrate portion is adjusted during forming of the device by adjusting the density of the substrate material.

In some embodiments, the sensor assembly further comprises a controller and an energy storage module for energizing the controller, the controller being coupled to the at least one sensor.

In some embodiments, the sensor assembly further comprises a memory module coupled to the controller, the memory module being configured to store the at least one transport parameter detected by the at least one sensor.

In some embodiments, the at least one sensor comprises at least one of a 3-axis accelerometer, a 3-axis gyroscope, a 3-axis magnetometer, a light sensor, a humidity sensor, a temperature sensor, and a GPS tracker.

In some embodiments, the controller is configured to track real-time during transportation.

In some embodiments, the sensor assembly is couplable to a peripheral device. For example, the peripheral device may be a laptop, smart phone, tablet, flash drive, database, or a server.

In some embodiments, the sensor assembly is wirelessly couplable to the peripheral device.

In some embodiments, the sensor assembly further comprises a wireless transmitter configured to wirelessly couple the sensor assembly to the peripheral device.

In some embodiments, the wireless transmitter comprises at least one of a Wi-Fi module, a Bluetooth module, and a NFC module.

In some embodiments, the sensor assembly is couplable to the peripheral device through a wired-connection.

In some embodiments, the housing includes a first housing end and a second housing end opposite the first housing end; the sensor assembly includes a first sensor assembly end and a second sensor assembly end opposite the first sensor assembly end, the sensor assembly being positioned within the housing such that the first sensor assembly end is proximate the first housing end.

In some embodiments, the sensor assembly further comprises a cap positioned at the first sensor assembly end, the cap having a cut-out portion defining a slot adapted to receive a cable for coupling the sensor assembly to a peripheral device.

In some embodiments, the device further comprises a spacer; the housing includes a first housing end and a second housing end opposite the first housing end; the sensor assembly includes a first sensor assembly end and a second sensor assembly end opposite the first sensor assembly end; the spacer being configured to space the second sensor assembly from the second housing end.

In some embodiments, the housing is generally tubular.

In some embodiments, the housing is generally vial-shaped, optionally blood vial-shaped.

In some embodiments, the sensor assembly is at least partially embedded in the hardened substrate portion.

In some embodiments, the sensor assembly is fully embedded in the hardened substrate portion.

In some embodiments, the device is positionable proximate the container within a carrier.

In some embodiments, the carrier is a carrier used to transport samples in a pneumatic tube system (PTS).

In some embodiments, the device and the container are positioned in a carrier together, such as a pneumatic tube system carrier for vials, or a sample vial tray (e.g. blood vial tray or rack). The carrier typically has openings or slots to receive and hold the device and a plurality of sample vials. The carrier is subject to carrier transport parameters during transportation, wherein the carrier transport parameters are translated into transport parameters to which a sample is subjected during the transportation. For example, in a pneumatic tube system, the PTS forces (e.g. air pressure and vacuum) act upon the carrier to alternately push and pull the carrier through a tubular pathway from a start location to a destination location (optionally the carrier may be temporarily held at holding points). These carrier transport parameters acting upon the carrier then cause transport parameters on the device and the container (device transport parameters and container transport parameters, respectively).

In some embodiments, the housing is formed from a hardened substrate material, the housing being integrally formed with the hardened substrate portion and comprising the same substrate material.

In some embodiments, the housing is open at the first and closed and rounded at the second end.

In accordance with another broad aspect, there is provided a device for detecting transport parameters experienced by the device during transportation of the device, optionally during a mixing, a coating and/or a conveying process, together with a plurality of substantially similar objects, the device comprising: a housing; a hardened substrate portion formed from a substrate material; and a sensor assembly comprising at least one sensor for detecting at least one transport parameter, the sensor assembly being secured within the housing by the hardened substrate portion; wherein the device is proximate some or all of the plurality of substantially similar objects during the transportation such that the device is subjected to device transport parameters similar to object transport parameters experienced by the plurality of substantially similar objects during the transportation.

In some embodiments, the at least one transport parameter is detected either at periodic time intervals or continuously.

In some embodiments, the sensor assembly is fixedly secured within the housing by the hardened substrate portion.

In some embodiments, the sensor assembly is removably secured within the housing by the hardened substrate portion.

In some embodiments, the housing has a configuration generally matching the configuration of at least one of the substantially similar objects.

In some embodiments, the sensor assembly measures the device transport parameters.

In some embodiments, the measured device transport parameters are representative or typical of the object transport parameters experienced by one or more of the objects during the object transport, though not representative of the object transport parameters experiences by any individual object.

In some embodiments, the substantially similar objects comprise substantially similar object sizes, object proportions, object densities and/or object weights.

In some embodiments, the device has substantially similar or substantially identical size, proportion, density and/or weight as the objects.

In some embodiments, the device has substantially similar or substantially identical size, proportion, density and/or weight as an average of the size, proportion, density and/or weight of one or more the objects.

In some embodiments, the object is a coated drug product or a coated food product, optionally a coated candy product.

In some embodiments, the transportation of the object is transportation in a mixer or in a conveyor.

In some embodiments, the coated drug product is a pharmaceutical dosage form, optionally a pill, capsule or tablet.

In some embodiments, the mixer is a mixing drum for coating pharmaceutical pills, capsules, or tablets with a coating.

In accordance with another broad aspect, there is provided a system for monitoring a sample during transportation, the sample stored in a container, the system comprising: (i) at least one sensor device positionable proximate the container during the transportation of the sample, the at least one sensor device comprising: a housing with a configuration generally matching the configuration of the container; a hardened substrate portion formed from a substrate material; and a sensor assembly comprising at least one sensor for detecting at least one transport parameter during the transportation, the sensor assembly being secured within the housing by the hardened substrate portion; and (ii) a computing device couplable to the sensor assembly of the at least one sensor device, the computing device comprising at least a processor, the processor being configured to retrieve the at least one transport parameter detected by the at least one sensor when coupled to the sensor assembly.

In some embodiments, the computing device is located remotely from the at least one sensor device.

In some embodiments, the at least one sensor device and the computing device are coupled via a wireless network.

In some embodiments, the system further comprises a memory coupled to the computing device and the at least one sensor device via the wireless network, the memory configured to store the at least one transport parameter detected by the at least one sensor during the transportation.

In some embodiments, a weight of the at least one sensor device approximates a combined weight of the container and the sample stored therein.

In accordance with another broad aspect, there is provided a method of making a device for detecting transport parameters to which a sample is subjected during transportation, the sample stored in a container, the sensor device positionable proximate the container during the transportation, the method comprising: (i) providing a housing with a configuration that generally matches the configuration of the container; (ii) positioning a sensor assembly within the housing, the sensor assembly comprising at least one sensor for detecting at least one transport parameter; (iii) adding a substrate material within the housing; and (iv) hardening the substrate material such that the sensor assembly is secured within the housing by the hardened substrate material.

In some embodiments, providing a housing involves providing an empty vial, optionally an empty blood vial.

In some embodiments, the method further comprises, before the step of adding a substrate material: determining a quantity of the substrate material to add within the housing such that a weight of the sensor device approximates a combined weight of the container and the sample stored therein.

In some embodiments, the substrate material comprises an epoxy and a filler, and the method further comprises, before the step of adding the substrate material: determining and mixing, optionally homogeneously mixing, relative proportions of the epoxy and the filler to add within the housing such that a weight the sensor device approximates a combined weight of the container and the sample stored therein.

In some embodiments, the weight of the sensor approximates an average combined weight based up the weight of a plurality of containers and corresponding samples stored therein.

In some embodiments, the housing comprises an first housing end and a second housing end opposite the first housing end; the sensor assembly further comprises a first sensor assembly end and a second sensor assembly end opposite the first sensor assembly end, and the step of positioning a sensor assembly comprises positioning the sensor assembly within the housing such that the first sensor assembly end is proximate the first housing end.

In some embodiments, the step of hardening the substrate material comprises thermoforming the substrate material. In such embodiments, the substrate material may comprise ethylene-vinyl acetate, polyurethanes, polyolefins, styrene block copolymers, or other suitable "hot melt adhesives".

In accordance with another broad aspect, there is provided a method for determining if a sample (blood sample or other biological tissue) is compromised (e.g. at increased risk of being damaged, such as hemolysis in a blood sample) during transportation, or if an object (e.g. object to be mixed, coated or conveyed, such as a drug product, food product etc.) is compromised (e.g. at increased risk of being damaged, such as improperly coated, improperly mixed or physically damaged (chipped, cracked etc.)) during transportation (e.g. processing (mixing, coating), shipping etc. with at least one other sample or object), the method comprising: transporting a suitable device described herein together with (typically proximate to) samples or objects, detecting (optionally measuring) transport parameters experienced by the device during transportation, determining whether the one or more transport parameters exceed corresponding transport parameter quality thresholds, wherein exceeding the transport parameter quality thresholds indicates that the sample or object is compromised (or at higher risk of compromise than a sample or object that did not exceed the transport parameter quality thresholds). One of skill in the art can readily set quality parameters, such as transport parameter quality thresholds, to determine if a sample or object is compromised. Optionally, the device has substantially similar or substantially identical size, proportion, density and/or weight as (i) the sample and/or container (for example, an average or approximation of the aforementioned parameters for the sample and/or container) or (ii) one or more the objects, where the objects are substantially identical in these parameters, or, where the objects are variable in these parameters (e.g. variable more than, for example, 5%, 10% or 20%), an average of the size, proportion, density and/or weight of one or more of the objects.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1A:
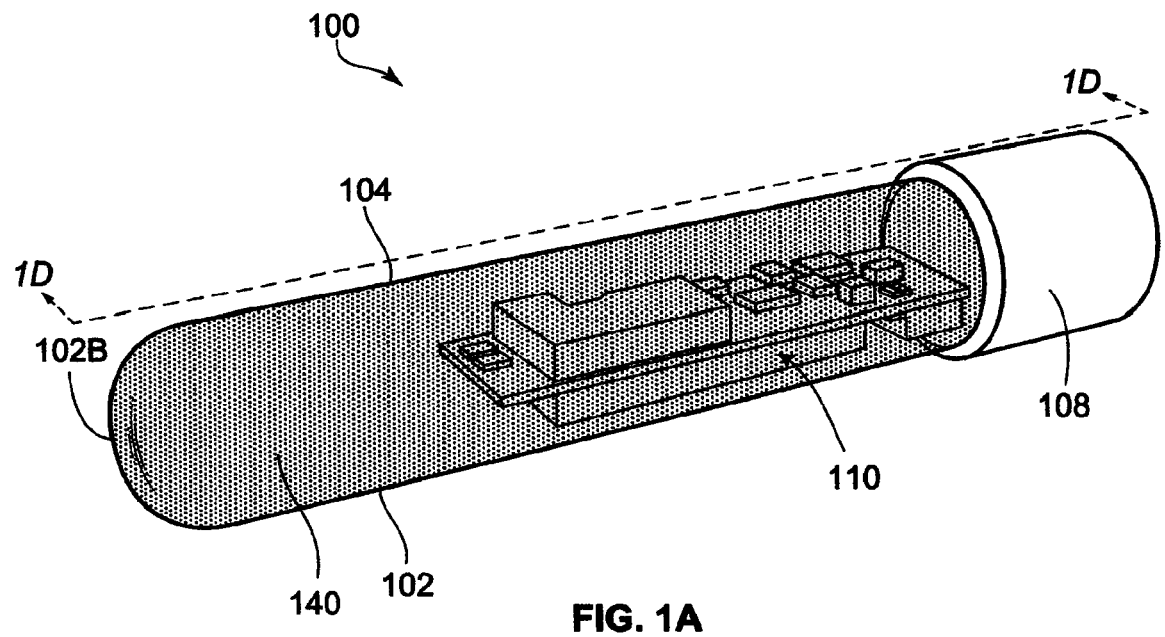
FIG. 1A is a side perspective view of an exemplary sensor device in accordance with a first embodiment.

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "an embodiment," "embodiment," "embodiments," "the embodiment", "the embodiments", "one or more embodiments", "some embodiments", and "one embodiment" mean "one or more (but not all) embodiments of the present invention(s)", unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

As used herein and in the claims, a first element is said to be 'communicatively coupled to' or 'communicatively connected to' or 'connected in communication with' a second element where the first element is configured to send or receive electronic signals (e.g. data) to or from the second element, and the second element is configured to receive or send the electronic signals from or to the first element. The communication may be wired (e.g. the first and second elements are connected by one or more data cables), or wireless (e.g. at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g. SPI, I2C, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

FIGS. 1A-1D illustrate an exemplary sensor device, referred to generally as 100, in accordance with a first embodiment. During transportation, the sensor device 100 is positioned proximate a container having a sample stored therein (i.e. a sample container). One of skill in the art is readily able to determine a suitable proximate position. For example, the sensor device 100 may be positioned in a carrying tray with other sample containers, such as a plastic, metal or foam tray typically used to hold samples in sample containers during transport. The trays typically have a plurality of openings in which sample containers are inserted (typically one sample container per opening).

The sensor device 100 may emulate the container during transportation, e.g. respond to vibrations and movement in the same or similar manner. The sensor device 100 may detect transport parameters (i.e. sensor device transport parameters) that are analogous or comparable to those transport parameters experienced by the container (i.e. container transport parameters). Accordingly, the detected transport parameters may be used to make inferences related to the quality or condition of the sample within the container. For example, the transport parameters that the sensor device 100 may detect include one or more (or all) of acceleration, orientation, temperature, humidity, location, and location.

In some cases, the container that the sample is stored in is a vial, a test tube, or other standardized sample collection container. For example, a blood vial or other biological specimen vial is useful. Optionally, the vial has a capacity between 0.5 mL to 100 mL, optionally 1 mL to 50 mL, or 1 mL to 10 mL. Standardized vials that are widely available may be useful. There are several standardized vials having volumes ranging between 1 and 10 mL, in increments of 1 mL.

There exists today an large install base of equipment that is configured to handle containers (vials) of the most common sizes. Such equipment includes, for example carrying racks, track lines within laboratories, centrifuges, robotic arms that pickup vial samples, bar coding and labeling machines, etc. Among the most common sizes include vials with 13 mm and 16 mm nominal outer diameters (the most common being vials with a 13 mm nominal outer diameter), which have the following actual dimensions (±manufacturing tolerances and variations by manufacturer):

| ID | Vial Vol. | Nominal Vial Dia. | Vial Outer Dia. | Nominal Vial Height | Vial Height | Vial Inner Diameter |
|---|---|---|---|---|---|---|
| 1 | 10 mL | 16 mm | 15.35 mm | 100 mm | 99.90 mm | 13.30 mm |
| 2 | 9 mL | 16 mm | 15.60 mm | 100 mm | 99.60 mm | 12.90 mm |
| 3 | 8 mL | 16 mm | 15.55 mm | 100 mm | 99.90 mm | 13.35 mm |
| 4 | 6 mL | 13 mm | 12.40 mm | 100 mm | 100.55 mm | 10.55 mm |
| 5 | 4 mL | 13 mm | 12.40 mm | 75 mm | 75.35 mm | 10.65 mm |

| ID | Cap Height | Cap Max Outer Dia. | Cap Inner Dia. | Total Sealed Height |
|---|---|---|---|---|
| 1 | 19.80 mm | 17.70 mm | 16.30 mm | 105.50 mm |
| 2 | 15.00 mm | 17.60 mm | 15.65 mm | 106.15 mm |
| 3 | 17.00 mm | 17.00 mm | 8.95 mm | 106.40 mm |
| 4 | 19.60 mm | 16.35 mm | 13.40 mm | 106.60 mm |
| 5 | 19.75 mm | 16.60 mm | 13.65 mm | 81.80 mm |

In the tables above, "Total Sealed Height" refers to a total height of the container when the vial is sealed by the cap, and "Vial Outer Dia." refers to a maximum outer lateral diameter of the vial exclusive of neck finish (e.g. threads or flange) if any.

In some cases, the sensor device 100 may have a dimensional configuration (e.g. size and shape) and/or weight that generally matches the configuration and a combined weight of the container and the sample stored therein (e.g. optionally less than: 30%, 15%, 10%, 5% or 1% variance in dimensions, volume and/or weight). As a result, the sensor device 100 responds to forces in the same or similar manner as the sample container. Further, by virtue of its proximate position to the container, the sensor device 100 may experience analogous or comparable environmental conditions (e.g., humidity, temperature, etc.) to those experienced by the sample stored within the container. Accordingly, the transport parameters detected by the sensor device 100 during transportation emulate or represent transport parameters to which the sample and sample container are subjected during transportation.

For example, the detected transport parameters may permit an individual receiving the container (e.g. a lab technician, analyst, or the like) to determine a quality of the sample. With this information, the individual may select to discharge or throw away the sample if one of the transport parameters detected by the sensor device 100 was outside an acceptable range during transportation. A new sample may then be obtained for testing that has not been subject to transport parameters outside an acceptable range. For example, blood samples may experience hemolysis (red blood cell disruption) if subjected to excessive vibrational forces or heat during pre-analytical transport, which can impact the accuracy of an analytical test result. The sensor device 100 also allows an assessment of the transportation network. The transporting network may be characterized as a path the sample travels along from a point of sample collection to a point of sample testing. For example, the sensor device 100 may reveal that for a portion of the transportation network, the sample experiences damaging levels of acceleration. Accordingly, this information may allow the transportation network to be altered to avoid this portion of the transportation network.

The sensor device 100 optionally includes a housing 102, and a sensor assembly 110 positioned within the housing 102. Sensor assembly 110 may be rigidly connected (e.g. adhesively coupled) to housing 102. For example, sensor device 100 may include a hardened substrate portion 140 that secures the sensor assembly 110 within the housing 102. The sensor assembly 110 may be partially (or fully) encapsulated within the hardened substrate portion 140. This arrangement provides for a robust sensor device 100 in which the sensor assembly 110 may be protected from user abuse and/or tampering by the hardened substrate portion 140. By rigidly connecting sensor assembly 110 within housing 102 (e.g. by partially or fully encapsulating/submerging sensor assembly 110 in the hardened substrate portion 140), spurious movements of the sensor assembly 110 within the housing 102 may be limited and/or prevented entirely. Spurious movements, which may include sensor assembly 110 rattling inside housing 102 may cause poor quality sensor readings (e.g. force, acceleration, etc.) which may not accurately reflect the experience of adjacent sample containers. Accordingly, the quality the data collected by sensor assembly 110 may be greatly improved by a rigid coupling of sensor assembly 110 to housing 102. Moreover, the lifespan of sensor device 100 may be extended by mitigating such spurious movements, which might otherwise cause failures such as cracks in housing 102 or solder joint failures in the electronics of sensor assembly 110.

In one or more embodiments, the at least one sensor 114 (also called a data logger) or the at least one sensor 114 and one or more other components (but not all) in the sensor assembly 110 are at least partially, optionally fully, encapsulated within the hardened substrate portion 140.

Figure 1B:
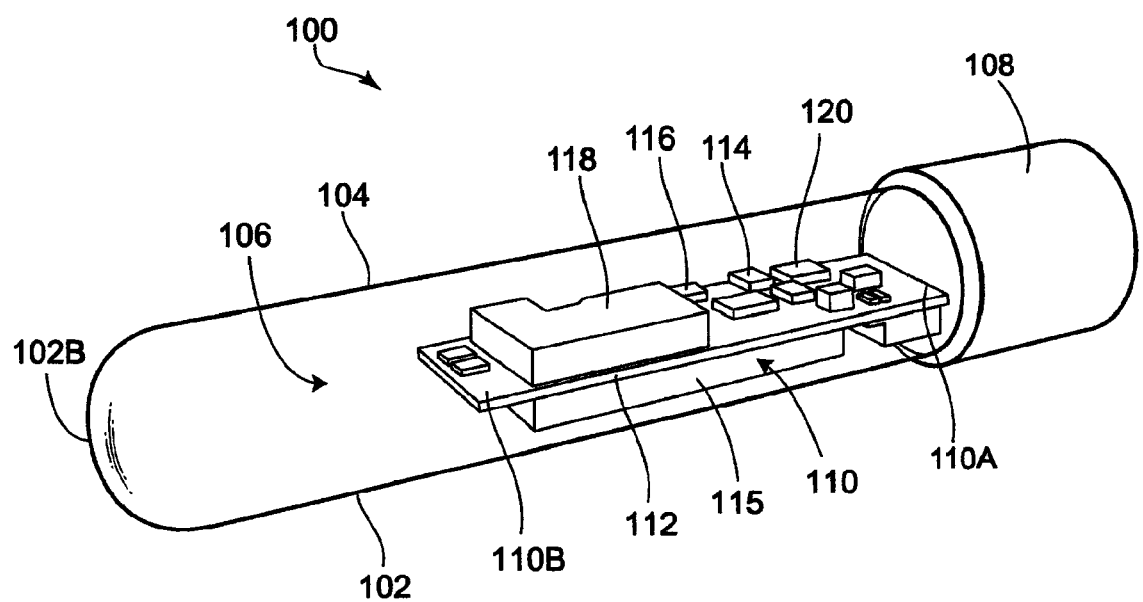
FIG. 1B is a side perspective view of the exemplary sensor device of FIG. 1A with a hardened substrate portion omitted.
Figure 1C:
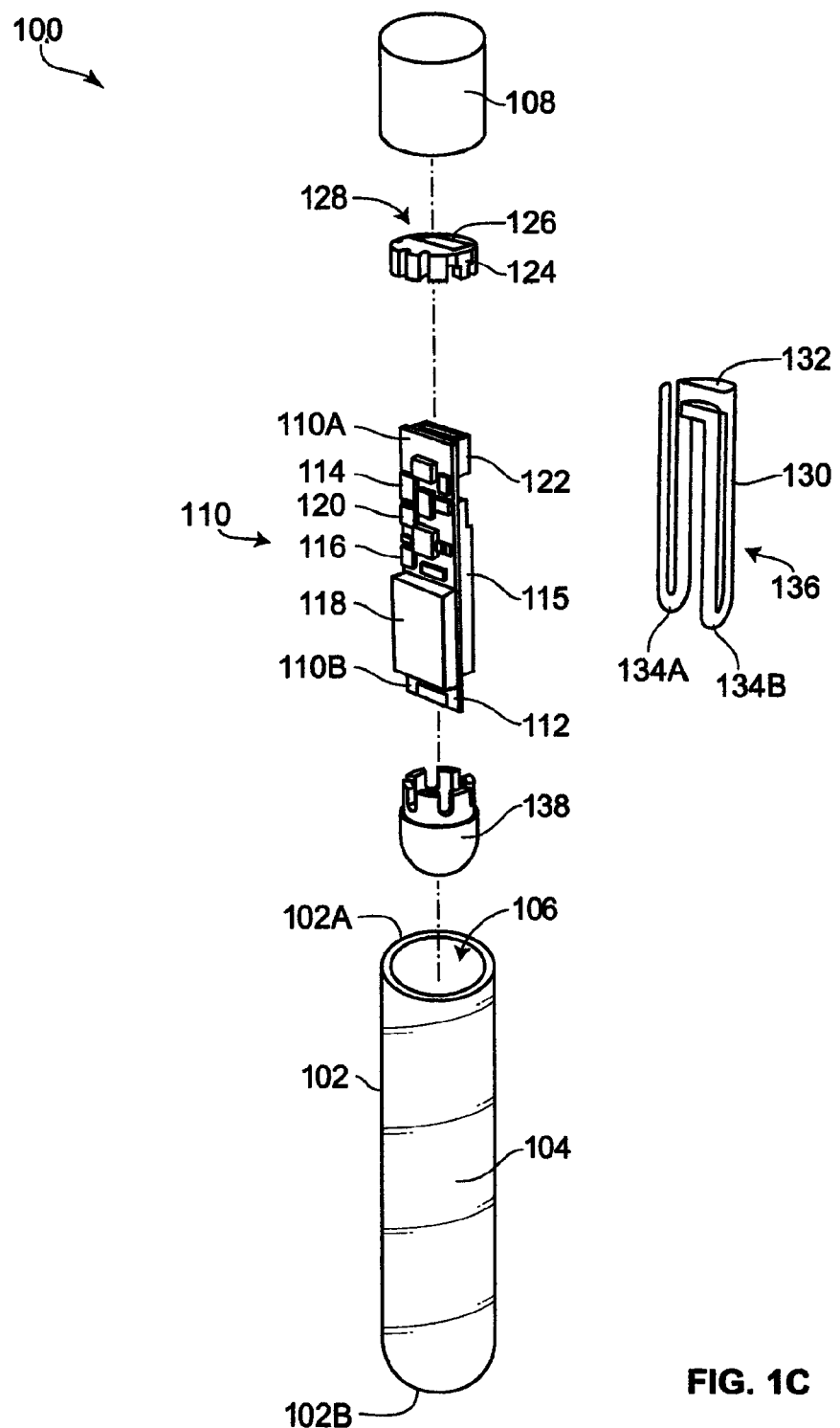
FIG. 1C is an exploded view of the exemplary sensor device of FIG. 1B.
Figure 1D:
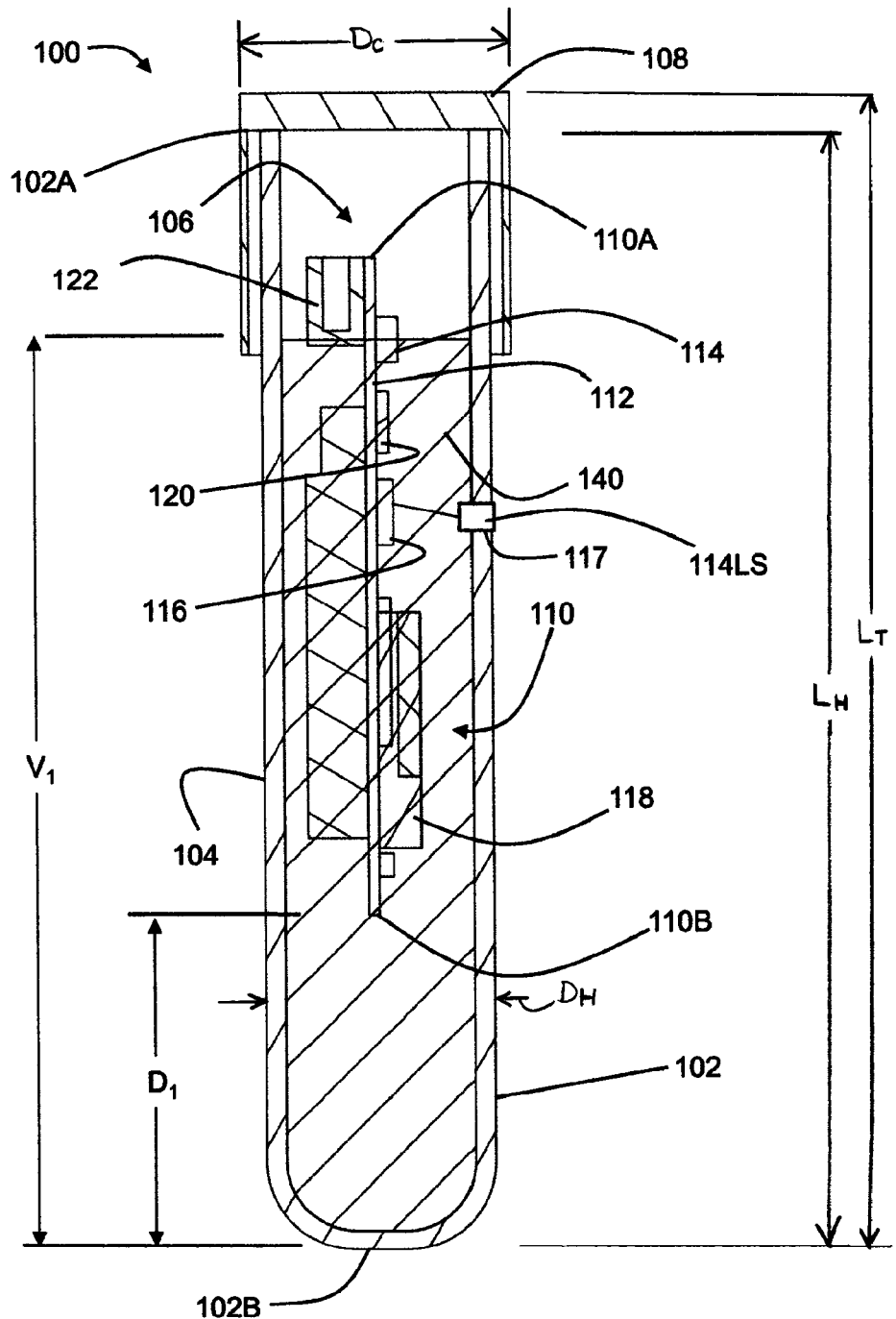
FIG. 1D is a cross-sectional view of the exemplary sensor device of FIG. 1A taken along the section line 1D-1D.

With reference to FIG. 1D, in the illustrated example, the sensor assembly 110 is almost entirely encapsulated by the hardened substrate 140. Only a small portion of the sensor assembly 110 extends from the hardened substrate portion 140. In this arrangement, the sensor assembly 110 is well protected by the hardened substrate portion 140. This arrangement may prevent movement and protect the sensor assembly 110. For example, the hardened substrate portion 140 may act to waterproof the sensor assembly 110 as well as protect it from shock, extreme temperatures, drops and/or corrosion. The hardened substrate portion 140 is omitted from FIGS. 1B and 1C to show more clearly the internal components of the sensor device 100. As described in more detail below, the hardened substrate portion 140 may comprise a number of suitable substrate materials, e.g. epoxy, silicon, polyester, polyamide, or other suitable plastic substrate or polymer substrate, whether transparent (e.g. allowing at least 75% of light in visible wavelengths to pass through), translucent (e.g. allowing 10-75% of light in visible wavelengths to pass through), or opaque (e.g. allowing less than 10% of light in visible wavelengths to pass through). Optionally, the hardened substrate portion 140 may be thermoformed into a thermoformed substrate.

With reference to FIGS. 1A-1C, the housing 102 has a configuration generally matching the configuration of the container that stores the sample for transportation. For example, the housing 102 may generally be of the same shape, weight, and/or size as the container (e.g. optionally less than: 20%, 15%, 10%, 5% or 1% variance in dimensions, volume and/or weight). In this way, the sensor device 100 may respond to forces (e.g. experienced during transportation) in a similar way as the container. The housing 102 has a first housing end 102A and a second housing end 102B opposite the first housing end 102A. The housing 102 comprises at least one outer wall 104 extending between the first housing end 102A and the second housing end 102B. The at least one housing wall 104 may define an inner space or cavity 106 (also referred to as housing interior volume 106).

As shown in FIG. 1D, housing 102 may have a longitudinal length $L_H$ measured from housing first end 102A to housing second end 102B, and a housing lateral outer diameter $D_H$ measured perpendicular to longitudinal length $L_H$. In some embodiments, outer diameter $D_H$ may be 12.5 mm±0.5 mm for compatibility with equipment made for vials having a 13 mm nominal outside diameter. This is by far the most common size of vial that equipment is made for today. In some embodiments, outer diameter $D_H$ may be 15.5 mm±0.5 mm for compatibility with equipment made for vials having a 16 mm nominal outside diameter. Sizing sensor device 100 for compatibility with existing equipment, allows sensor device 100 to accompany other sample containers (e.g. vials) in this equipment in order to measure transport parameters experienced by such other sample containers when they are handled and transported by this equipment.

In illustrated example, the housing 102 is generally tubular having an open first end 102A and a closed second end 102B. Second end 102B may be rounded as shown. Sensor assembly 110 can be inserted within the inner space 106 via the open first end 102A. As shown, the open first end 102A is optionally closed with a container cap 108. It will be understood by those skilled in the art that the housing 102 may have other suitable configurations. For example, in one or more alternative embodiments, the housing 102 may have a generally rectangular cross-section. In such embodiments, the at least one outer wall 104 may be four outer walls extending from a base wall.

In some cases, the housing 102 may have a configuration that generally matches the configuration of a standard vial for storing blood, urine or other biological samples. These standard vials typically include a cap in order to retain the sample therein. Accordingly, in such cases, the sensor device 100 also includes the container cap 108 to closely match the configuration and/or weight of the standard vial.

Container cap 108 may be connected (e.g. permanently or removably) to housing first end 102A to hermetically seal sensor assembly 110 inside housing 102. As shown, sensor assembly 110 may be entirely located within housing interior volume 106. For example, sensor assembly 110 may extend longitudinally from a first end 110A to a second end 110B and both ends 110A and 110B may be located inside of housing 102 when container cap 108 is connected and sealing housing first end 102A.

In some embodiments, container cap 108 may have an outer lateral diameter $D_C$ that is greater than housing lateral outer diameter $D_H$. This may provide sensor device 100 with compatibility for equipment that require vials to have a cap diameter greater the housing diameter (e.g. equipment that suspends vials on the flange created by this dimensional difference). This may be alternative to or in addition to providing a housing diameter $D_H$ that is compatible with equipment made for vials having a particular (e.g. 13 mm or 16 mm) nominal outside diameter as described above.

Some equipment are configured to require vials of particular diameter (e.g. 13 mm or 16 mm nominal outer diameters, as described above) and/or of particular height (e.g. 75 mm or 100 mm nominal vial height). Alternatively or in addition to providing housing 102 with an outside diameter $D_H$ sized for capability with equipment requiring vials with a particular nominal outer diameter (e.g. 13 mm or 16 mm nominal outer dimeter as described above), and alternatively or in addition to providing container cap 108 with an outside diameter $D_C$ greater than housing outside diameter $D_H$ for compatibility with equipment that requires this dimensional difference, sensor device 100 may have a height (also referred to as a length) sized for compatibility with equipment requirements.

Still referring to FIG. 1D, sensor device 100 may have a total longitudinal length $L_T$, when container cap 108 is connected and sealing housing first end 102A. In some embodiments, longitudinal length $L_T$ may be 95 mm to 115 mm for compatibility with equipment designed for vials with a nominal 100 mm height. In some embodiments, longitudinal length $L_T$ may be 70 mm to 90 mm for compatibility with equipment designed for vials with a nominal 75 mm height. Sizing sensor device 100 for compatibility with existing equipment, allows sensor device 100 to accompany other sample containers in this equipment in order to measure transport parameters experienced by such other sample containers when they are handled and transported by this equipment.

With reference to FIG. 1C, the sensor assembly 110 includes at least one sensor 114 for detecting at least one transport parameter. As described above, the sensor assembly 110 is rigidly secured within the housing 102 (e.g. by the hardened substrate portion 140). The sensor assembly 110 has a first sensor assembly end 110A and a second sensor assembly end 1106 opposite the first sensor assembly end 110A. The sensor assembly 110 can be positioned at any suitable location along the housing 102. A distance $D_1$ is measured between the second sensor assembly end 1106 and the second housing end 102B. For example, the distance $D_1$ can be suitably adjusted by varying a volume $V_1$ of the hardened substrate portion 140. Alternatively, the distance $D_1$ can be adjusted by adjusting a depth to which the sensor assembly 110 is inserted into the substrate material before it hardens.

With reference to FIG. 1D, in the illustrated example, the sensor assembly 110 is positioned within the inner space 106 so that the first sensor assembly end 110A is proximate (e.g. generally level with or inboard) the first housing end 102A. The sensor assembly 110 is rigidly connected to housing 102, such as for example by the hardened substrate portion 140. In the illustrated example, the first sensor assembly end 110A extends from the hardened substrate portion 140. As will be described in more detail below, this arrangement may permit an external peripheral device (not shown) to be coupled to the sensor assembly 110 via the first sensor assembly end 110A.

Returning to FIG. 1C, the sensor assembly 110 also includes a controller 116 communciatively coupled to the at least one sensor 114, and electrically coupled to an energy storage module 118 (e.g. a battery) for energizing the controller 116. In the illustrated example, the at least one sensor 114, the controller 116 and the energy storage module 118 are mounted or connected to a circuit board 112. The circuit board 112 communicatively couples the at least one sensor 114 to the controller 116, and electrically coupled the energy storage module 118 to the controller 116 and/or sensor(s) 114.

In the illustrated example, the at least one sensor 114 is a plurality of sensors including a 3-axis accelerometer, a 3-axis gyroscope, a 3-axis magnetometer, a temperature sensor, a humidity sensor, a light sensor, and/or a GPS tracker. It will be appreciated that in one or more alternative embodiments, the sensor assembly 110 can include different combinations of the above-noted sensors (optionally any 2, 3, 4 or 5 of the aforementioned sensors or all the sensors).

The 3-axis accelerator sensor captures data related to vibration or acceleration during transportation. The 3-axis gyroscope and the 3-axis magnetometer capture data related to orientation during transportation. The GPS tracker captures data related to the location. The location data may be useful, for example, in establishing a chain of custody for the sample. The light sensor captures data related to light intensity. Prolonged exposure to light can damage samples that are stored in clear or see-through containers. The temperature and humidity sensors measure temperature and humidity, respectively.

In some cases, the controller 116 is configured to track elapsed time during transportation (i.e. the time it takes the sample and sample container to travel from point A (first location) to point B (second location)). Accordingly, a receiver of the sample may know how long the sample and sample container spent in transit. The elapsed time tracking capability of the controller 116 together with the GPS tracker can provide for an assessment of the transportation network. It can also provide a comparison between alternative transportation networks, routes and/or schedules to determine the one most suitable.

In some cases, the controller 116 is configured to track real-time during transportation. For example, the controller 116 may start tracking real-time at the beginning of transportation (i.e. at a collection site) and then stop tracking real-time when received (i.e. at a testing site). The at least one transport parameter detected by the at least one sensor 114 can be associated or linked with the tracked real-time by the controller 116. For example, controller 116 may store data associated with readings taken by the at least one sensor 114 in memory. This may provide for an analysis of the change in the at least one transport parameter over time.

If the sensor device 100 detects that one or more of the transport parameters affecting a sample (e.g. pre-analytical sample) and its container exceed a quality threshold (e.g. a specific transport parameter value exceeds its corresponding quality threshold value, above which value there is an increased risk of sample damage), then a user can determine from the collected transport parameters which quality threshold has been exceeded, and the amount by which it has been exceeded (optionally also the time period for which the threshold has been exceeded). Exceeding one or more quality thresholds indicates a risk that the sample is compromised (e.g. risk of damage, for example, potentially hemolysis, in the case of a pre-analytical blood sample).

For example, if it is detected that one or more numerical quality threshold values, such as maximum acceleration, force, temperature, humidity, light and/or time threshold values have been exceeded during transportation, then the risk of damage to a sample may exceed acceptable quality control risk and the sample is determined to be compromised (e.g. compromised in the sense that damage can cause unacceptably high risk of inaccurate test results). For example, a transport parameter exceeding a quality threshold value by 20% typically indicates higher risk of sample damage than the same transport parameter exceeding a quality threshold value by 5%. A person of skill in the art optionally sets quality threshold values for each transport parameter to determine when it is deemed compromised (the quality threshold values may vary, for example, depending on the sample type and risk tolerance).

A plurality of transport parameters falling outside quality threshold values typically also indicates higher risk of sample damage compared to a situation with no transport parameters exceeding quality threshold values. The transport parameter values are optionally presented in a quality report, and if one or more threshold values for a transport parameter are violated (i.e. a transport parameter falls outside of the value range defined by the threshold values), the quality report optionally provides an alert or a notation of the exceeded threshold value(s). For example, the quality report may inform the user that one or more quality thresholds (e.g. numerical threshold values), such as a minimum, maximum, or range of acceleration, force, temperature, humidity, light and/or time threshold values, have been violated. Optionally, the quality report indicates a determination that the sample is compromised. For example, this information can be valuable in making decisions on whether to test or not test the sample, or in some cases, whether to alter transportation networks and/or transportation schedules.

As an example, the quality threshold values for a sample intended to be kept at room temperature may be 20° C.-25° C. (i.e. the sample may be compromised if the temperature readings fall outside this temperature range). As another example, the quality threshold values for a sample intended to be kept refrigerated may be 2° C.-8° C. As another example, the quality threshold values for a sample intended to be kept frozen may be −10° C. to −25° C.

In some embodiments, the quality thresholds may include a maximum, minimum or range of mean kinetic temperatures (MKT) which reflect the cumulative temperature experienced by the sample. The MKT quality threshold for a sample intended to be kept at room temperature may be less than or equal to 25° C. (i.e. the sample may be compromised if the MKT is 25° C. or greater). The MKT quality threshold for a sample intended to be kept frozen refrigerated may be less than 8° C.

Therefore, another aspect of the invention relates to a method for determining if a sample (optionally a biological sample, typically a pre-analytical biological sample) is compromised during transport, comprising: positioning the sample proximate to a device disclosed herein; transporting the sample and device, the device detecting transport parameters; determining if a detected transport parameter exceeds a corresponding transport parameter threshold quality value; wherein a determination that a detected transport parameter exceeds a corresponding transport parameter quality threshold value indicates an increased risk that the sample has been damaged, and/or optionally indicates that the sample is compromised. Optionally, the method further comprises determining the time period for which the transport parameter exceeds the corresponding transport parameter quality threshold value, wherein a time period for longer than a maximum time threshold value optionally indicates an increased risk that the sample has been damaged, and/or optionally indicates that the sample is compromised.

With continued reference to FIG. 1C, in the illustrated example, the sensor assembly 110 may include a communications module, such as for example a wireless transmitter 115 configured to communicatively couple the controller 116 to an external peripheral device. For example the communications module 115 may include at least one of a Wi-Fi module, a Bluetooth module and a NFC module configured to communicatively couple the controller 116 to the external peripheral device (e.g. a remote server, remote database, an external laptop or tablet smart phone, smart watch, or special purpose scanner etc.). In such embodiments, the controller 116 may transmit data associated with the at least one transport parameter detected by the at least one sensor 114, for example, to cloud-based storage and/or a user's smart phone. This may be done continuously in real-time or at the end of transportation. Accordingly, this may permit the at least one transport parameter (e.g. temperature, acceleration, etc.) to be monitored as the sample or samples are transported or analyzed at the end of transportation, to assess a quality or condition of the samples.

In the illustrated example, the sensor assembly 110 also includes a memory module 120 communicatively coupled to the controller 116. The memory module 120 is configured to store data associated with (e.g. indicative of) the at least one transport parameter detected by the at least one sensor 114. The memory module 120 can include RAM, ROM, one or more hard drives, one or more flash drives or some other suitable data storage elements such as disk drives, etc. As shown, the memory module 120 may be communicatively coupled to the controller 116 via the circuit board 112. The controller 116 can instruct the memory module 120 to write and/or retrieve data.

In some cases, the memory module 120 can store the at least one transport parameter (or data associated with (e.g. indicative of) the at least one transport parameter) detected by the at least one sensor in at least near real-time (e.g. continuously or periodically at a relatively high frequency (e.g. at least one measurement per minute)) during transportation of the sample. In cases where the at least one transport parameter is transmitted in at least near real-time to a peripheral device and the wireless signal is lost or interrupted, e.g. between the wireless transmitter 115 and the peripheral device, the memory module 120 can serve as a safeguard against the loss of transportation data.

In some embodiments, one or more transport parameters (or data associated with (e.g. indicative of) the one or more transport parameters) may be—detected by the at least one sensor and/or stored in memory module 120 and/or transmitted to a peripheral device—in non-real time (e.g. intermittently at a relatively low frequency (e.g. less than one measurement per minute, such as one measurement per 30 minutes or more, or one measurement per hour or more). Such low frequency data collection may be appropriate for certain transport parameters in certain applications, and may help conserve battery life, which may allow sensor assembly 110 to have longer battery life or use a smaller, lighter battery 118 for a more compact overall size.

As described above, the peripheral device may wirelessly access data associated with the at least one transport parameter from the memory module 120, e.g. via the communications module 115. In some embodiments, a peripheral device may access the at least one transport parameter through a wired-connection, e.g. connecting the peripheral device by wire to the sensor assembly 110. Communications module 115 may include a port for direct or indirect connection to the peripheral device, for example, a port for connection to a data transmission cable (wire, optical cable etc.) that is communicatively coupled to a computer storage medium (e.g. flash drive), or for connection directly to a peripheral device that contains a computer storage medium. In the illustrated example, communications module 115 may include a connection hub 122 at the first sensor assembly end 110A. The connection hub 122 may be communicatively coupled to the controller 116 through the circuit board 112. As shown in FIG. 1D, the connection hub 122 may be accessible when container cap 108 is removed. For example, the connection hub 122 may extend out of the hardened substrate portion 140 (in embodiments that include hardened substrate 140) such that it is accessible when the device cap 108 is removed. In this way, to retrieve the transportation data from the memory module 120, the peripheral device can be coupled to connection hub 122 of the sensor assembly 110 via a cable (e.g. a USB cable).

The connection hub 622 may implement any communication protocol, such as for example one or more of USB, UART, FTDI, JTAG, SPI, I2C. In some cases, the energy storage module 118 may be charged via a wired-connection, such as a port, e.g. a USB connection between the connection hub 122 of the sensor assembly 110 and an external power source, e.g. a peripheral device or a power outlet. In one or more alternative embodiments, the energy storage module 118 may be charged wirelessly (e.g. by an on-board energy coil that is powered by Bluetooth and/or Wi-Fi signals).

With continued reference to FIG. 1C, in the illustrated example, the sensor assembly 110 also includes a sensor cap 124 positioned at the first sensor assembly end 110A. The sensor cap 124 has a cut-out portion 126 defining an access slot 128. The access slot 128 is adapted so that a USB connector or the like may pass therethrough before coupling with the sensor assembly 110 via the connection hub 122. The sensor cap 124 is omitted in FIGS. 1A, 1B and 1D for clarity.

It will be appreciated that the sensor cap 124 is shaped to generally match the cross-sectional shape of the housing 102. Preferably, the sensor cap 124 is sized to snugly fit within the inner space 106. Frictional engagement between the outer edge of the sensor cap 124 and the inner surface of the at least one outer wall 104 may improve the stability of the sensor assembly 110. The sensor cap 124 may also limit and/or prevent the hardened substrate 140 from forming above or on the first sensor assembly end 110A. In this way, the first sensor assembly end 102A may remain accessible for wired-connections, e.g. as described above. Sensor cap 124 may form part of a spacer assembly (also referred to as a spacer) described below.

As described above, the hardened substrate portion 140 may be transparent, translucent, or opaque. Alternatively, the hardened substrate portion 140 may be further divided into sub-portions each having different properties. Referring to FIG. 1A, in the illustrated example, the hardened substrate portion 140 is translucent. A hardened substrate portion 140 that is translucent can provide protection from light damage while permitting the sensor assembly 110 to be seen from outside the housing 102.

A hardened substrate portion 140 that is opaque (i.e. not see-through) may have one or more advantages. For example, the opaque hardened substrate portion 140 may protect the sensor assembly 110 from light damage. In some cases, when the sensor assembly 110 is encapsulated in the opaque hardened substrate portion 140, it cannot be seen from outside the housing 102. In such embodiments, a transparent or partially see-through positioning clip 130 may be used to view at least of a portion of the sensor assembly 110 from outside the housing 102.

In embodiments where the hardened portion 140 is opaque or translucent and the at least one sensor 114 includes a light sensor, the light sensor is preferably positioned in an aperture defined in the at least one outer wall 104 of the housing 102. Referring to FIG. 1D, in the illustrated example, a light sensor 114LS is positioned in an aperture 117 defined in the at least one outer wall 104. In this way, the light sensor 114LS may detect light intensity that is analogous or comparable to light intensity subjected to a proximate sample stored in a clear or at least partially see-through container. In the illustrated example, the light sensor 114LS is communicatively coupled directly to the controller 116. In one or more alternative examples, the light sensor 114LS may be positioned elsewhere along the at least one outer wall 104 and/or coupled differently to the controller 116. In some cases, a plurality of light sensors 114LS may be included and positioned to detect light intensity at multiple locations around the housing 102.

In embodiments where the hardened portion 140 is transparent and the at least one sensor includes a light sensor, the light sensor may be positioned along the circuit board 112 or elsewhere within the inner space 106. Since, in this case, the hardened substrate portion 140 is transparent, the light sensor can detect light intensity therethrough.

Referring to FIG. 1C, the positioning clip 130 is positioned around the sensor assembly 110 when the sensor assembly 110 is inserted into the housing 102. The positioning clip 130 includes a wedge portion 132 that fits or wedges between the sensor assembly 110 and the at least one outer wall 104. The wedge portion 132 may be characterized as a "light pipe" or a "viewing window" between the housing 102 and the sensor assembly 110. Preferably, the positioning clip 130 is configured so that, when positioned around the sensor assembly 110, the wedge portion 132 sits on or is adjacent to a status indicator of the sensor assembly 110 (e.g. an LED light). Accordingly, the wedge portion 132 of the positioning clip 130 can permit a status of the sensor assembly 110 to be checked (e.g. power on/off, battery remaining, etc.) from outside the housing 102 when using the opaque hardened substrate portion 140.

In the illustrated example, the positioning clip 130 includes first and second projections 134A and 134B extending generally perpendicularly from the wedge portion 132. As shown in FIG. 1C, the first and second projections 134A and 134B are generally U-shaped. The first and second projections 134A and 134B define a retaining slot 136 in which the sensor assembly 110 may sit and/or engage. In some cases, the sensor assembly 110 may fit snugly within the retaining slot 136 to improve stability. Accordingly, positioning clip 130 may surround sensor assembly 110. Positioning clip 130 may be rigidly connected to sensor assembly 110 (e.g. by friction, fastener, or adhesive). The positioning clip is omitted in FIGS. 1A, 1B and 1D for clarity. Positioning clip 130 may also be referred to as a spacer. Some embodiments may not include positioning clip 130.

As described above, the sensor assembly 110 is at least partially encapsulated in the hardened substrate portion 140. This arrangement limits movement of the sensor assembly 110 relative to the housing 102 and, as a result, can improve the accuracy of the at least one transport parameter collected by the at least one sensor 114 and/or protect the sensor assembly 110 from damage. A substrate material is added to the housing 102 after the sensor assembly 110 is positioned therein. However, in some cases, the substrate material may be added to housing 102 before the sensor assembly 110. In such cases, the sensor assembly 110 is at least partially inserted into the substrate material that has already been added within the inner space 106.

Once the substrate material has been added to the housing 102 it takes time to set. For example, the substrate material may take about an hour to set and about 10 hours to harden. As noted above, there are a number of suitable substrate materials that may be used, e.g. epoxy, silicon, polyamide, polyester, etc. Preferably, the substrate material does not expand or contract while hardening and/or setting. In some cases, the substrate material may be thermally conductive. This may improve the response time and/or accuracy of the temperature sensor 114.

As described above, in some cases, a weight of the sensor device 100 approximates a combined weight of the container and the sample stored therein. To approximate the weight, the density of the substrate material can be adjusted to approximate the density of the sample. For example, if blood is the sample, then the density and/or volume of the substrate material may be tailored so that the weight of the sensor device 100 approximates a combined weight of the container (e.g. vial) and the blood sample stored therein. The average density of human blood (commonly referred to "whole blood") is 1060 kilograms per cubic meter.

In some cases, the weight of the sensor device 100 is about 70 to 130% of the combined weight of the container and sample stored therein. Optionally, the weight of the sensor device 100 is about 90 to 110% of the combined weight of the container and the sample stored therein. Due to the weight approximation, when the sensor device 100 is positioned proximate the container with the sample stored therein, the at least one sensor 114 is able to detect acceleration and/or vibrational forces analogous or comparable to those experienced in the container during transportation and representative of the sample stored therein.

In some embodiments, sensor device 100 may not be configured to have approximately the same weight as adjacent sample containers, and instead data collected by sensor device 100 may be manipulated by sensor device 100 or an external peripheral device to account for the disparity in weight between sensor device 100 and adjacent sample containers.

The following table shows the approximate weights of various standard vials filled to their stated capacity:

| ID | Vial Vol. | Nominal Vial Dia. | Nominal Vial Height | Filled Sealed Weight |
|---|---|---|---|---|
| 1 | 10 mL | 16 mm | 100 mm | 19.2 g |
| 2 | 9 mL | 16 mm | 100 mm | 18.5 g |
| 3 | 8 mL | 16 mm | 100 mm | 17.1 g |
| 4 | 6 mL | 13 mm | 100 mm | 13.2 g |
| 5 | 4 mL | 13 mm | 75 mm | 10.0 g |

In the above table, "Filled Sealed Weight" refers to the weight of the entire container, including the vial sealed by its cap with the vial filled to the stated volume with a representative bodily fluid.

One of skill in the art will appreciate that if there are a plurality of samples in sample containers that are transported with the device, then the transport parameters collected by the sensor device 100 may potentially be less representative of certain parameters experienced by samples and sample containers located farther away from the sensor device 100. However, for example, in a typical carrier for blood vials (such as in a PTS or typical blood sample carrying tray), the transport parameters detected by the sensor device 100 are considered to be representative of forces experienced by all the blood vials, because the plurality of vials are typically packaged (held) closely together, in a relatively small carrier, in the same orientation. Regardless, one of skill in the art will be able to readily assess risk of damage and compromise to samples.

The weight of the sensor device 100 may be adjusted by adjusting a weight of the hardened substrate portion 140. For example, to adjust the weight of the hardened substrate portion 140, a volume or quantity of the substrate material added to the housing may be varied. In the illustrated example, the substrate material is an epoxy. Accordingly, more or less epoxy can be added to the housing 102 to respectively increase or decrease the weight of the hardened substrate portion 140.

In some cases, substrate material includes a filler. The filler is optionally used to adjust the density of the hardened substrate material 140 so that the weight of the sensor device 100 approximates the combined weight of the container and the sample stored therein. The filler and substrate material may be mixed together prior to be added to the housing 102. Optionally, the substrate material and the filler are homogenously mixed. For example, adding a filler to the substrate material to decrease the density of the hardened substrate portion 140 may allow the hardened substrate portion 140 to occupy a greater volume of the inner space 106 for a given weight. This may allow the hardened substrate portion 140 to better protect and/or immobilize the sensor assembly 110. In such cases, the filler may be characterized as a "density-reducing filler".

In the illustrated example, hollow microspheres, optionally glass microspheres, are added to the epoxy to decrease the density of the hardened substrate portion 140. Other suitable fillers may be used to adjust the density and/or volume of the hardened substrate portion 140, e.g. plastic microspheres, silica, metallic fibers, etc. In one or more alternative embodiments, plastic microspheres or silica may be added to the substrate material to increase the density of the hardened substrate portion 140. In such embodiments, the filler may be characterized as a "density-increasing filler".

The combined weight of the container and the sample stored therein is either known or measured before adding the substrate material to the housing 102. For example, the average weight of a vial containing blood is approximately 10-20 grams depending on the size of vial (see table above). In the example of a 20 gram vial, the weight of the hardened substrate portion 140 can be adjusted so that the weight of the sensor device 100 is approximately 20 grams (optionally the weight of sensor device 100 is within plus or minus 5% or 10% of the average weight of the vial containing blood). Once the combined weight of the container and sample stored therein has been determined, a suitable amount of substrate material may be calculated and then added to the housing 102 so that the weight of the sensor device 100 approximates that combined weight.

As noted above, in the illustrated example, the hardened substrate portion 140 comprises an epoxy and hollow glass microspheres. In this way, the weight of the hardened substrate portion 140 may be adjusted by varying the relative weight proportions of the epoxy (the substrate material) and the hollow glass microspheres (the filler).

Referring to FIG. 1C, in the illustrated example, the sensor device 100 also includes an optional plug 138 positioned proximate the second housing end 102B. Plug 138 may form part of a spacer. The plug 138 is omitted from FIGS. 1A, 1B and 1D for clarity. For example, the plug 138 can be placed within the inner space 106 prior to the sensor assembly 110 and the substrate material are added. In some cases, the plug 138 may improve the balance of the sensor device 100. In such cases, the plug 138 may aid in evenly distributing weight along the housing 102 so that the distribution better matches that of the container with the sample stored therein. For example, a plurality of plugs 138 with different weights may be available. In such cases, the plug 138 selected is the one that allows the sensor device 100 to approximate the combined weight of the container and the sample stored therein.

By approximating the combined weight of the container and the sample stored therein, the at least one sensor 114 (positioned within the housing 102) responds to forces in a similar way as the sample stored in the container. Force equals mass times acceleration; therefore, if the sensor device 100 has a substantially different mass than the combined weight of the container and the sample stored therein, the at least one transport parameter (e.g. acceleration) detected by the at least one sensor 114 may not reflect or represent what the sample is experiencing during transportation. Accordingly, when the sensor device 100 is positioned proximate the container during transportation, it permits detection of vibrations and/or environmental conditions that are analogous or comparable to the vibrations and/or environmental conditions subjected to the container holding the sample and in turn, representative of the sample stored therein. This may mitigate sensor device 100 or an external peripheral device from having to manipulate the collected sensor data to account for the disparity in weight between the sensor device 100 and adjacent sample containers, whose transport parameters are being monitored. The transportation data collected by the sensor device 100 can be used to improve sample transportation networks (e.g. during times of abnormally high stress) or to ensure that the transportation network is operating at levels that have been determined to be acceptable or non-damaging to the sample.

In one or more alternative embodiments, the housing 102 may be formed from a hardened substrate material. The substrate material used to form the housing 102 may be the same substrate material used to form the hardened substrate portion 140. In such embodiments, the housing 102 may be integrally formed with the hardened substrate portion, e.g. by low pressure over molding or a similar molding process.

Figure 2A:
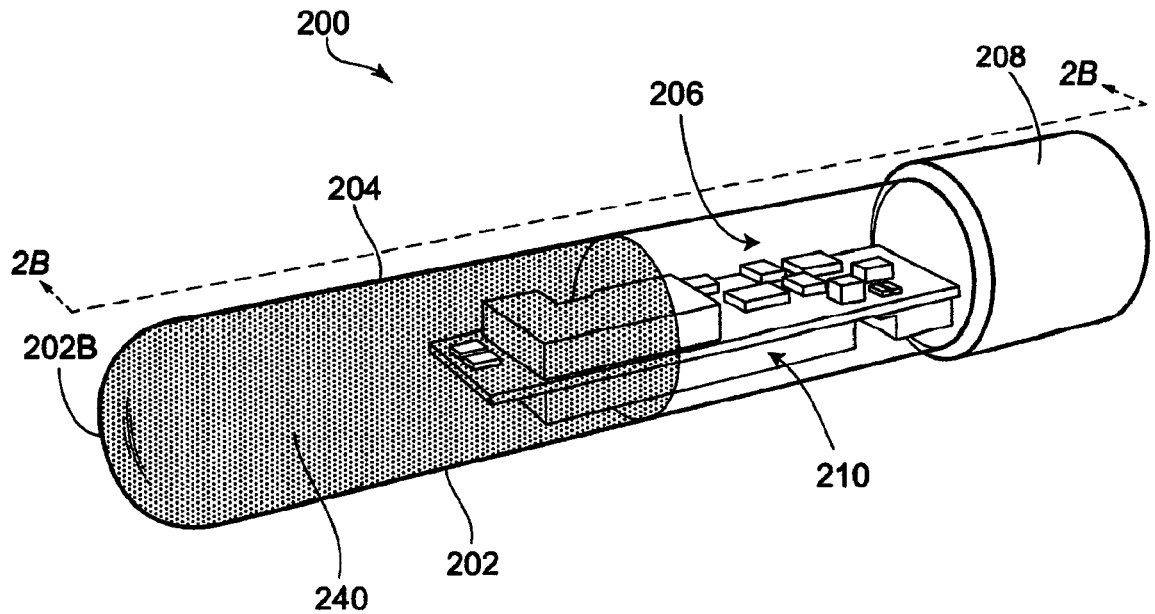
FIG. 2A is a side perspective view of an exemplary sensor device in accordance with a second embodiment.
Figure 2B:
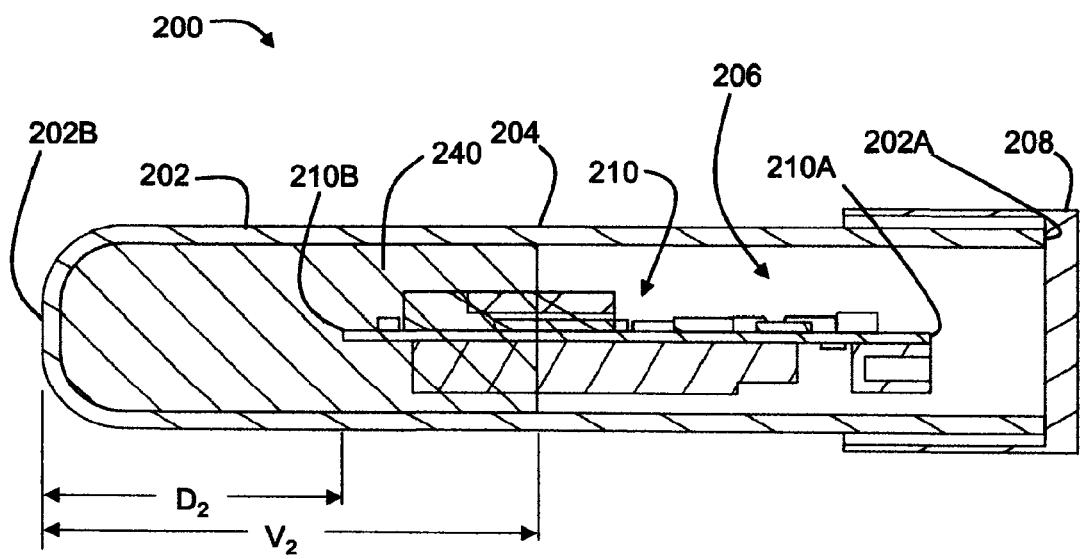
FIG. 2B is a cross-sectional view of the exemplary sensor device of FIG. 2A taken along the section line 2B-2B.

FIGS. 2A and 2B illustrate an exemplary sensor device, referred to generally as 200, in accordance with a second embodiment. The sensor device 200 shown in FIGS. 2A and 2B is similar to the sensor device 100 shown in FIGS. 1A-1D, except that the inner space 206 includes a smaller hardened substrate portion 240. Elements having similar structure and/or performing similar function as those in the sensor device 100 of FIGS. 1A-1D are numbered similarly, with the reference numerals incremented by 100.

The sensor assembly 210 is partially encapsulated by the hardened substrate portion 240. With reference to FIGS. 1D and 2B, a greater portion of the sensor assembly 210 extends from the hardened substrate portion 240 compared to the sensor assembly 110 of the sensor device 100 shown in FIGS. 1A-1D.

Referring to FIG. 2B, a distance $D_2$ is measured between the second sensor assembly end 210B and the second housing end 202B. In the example shown, the distance $D_2$ is generally the same as the distance $D_1$ shown in FIG. 1D; however, a volume $V_2$ of the hardened substrate portion 240 has been reduced. The volume $V_2$ of the hardened substrate portion 240 can be adjusted to approximate the weight of the sensor device 200 to a combined weight of a container and a sample stored therein. For example, since the volume $V_2$ of the hardened substrate portion 240 is reduced when compared to the volume $V_1$ of the hardened substrate portion 140, the weight of the sensor device 200 may be smaller than the weight of the sensor device 100. For example, $V_2$ may be less than 50% of a volume of housing interior volume 206 (as compared to $V_1$ which as shown may be greater than 50% of a volume of housing interior volume 206). In this way, the weight of the sensor device 200 may approximate a lower combined weight than the combined weight approximated by the sensor device 100. For example, the sample taken may be smaller or less dense.

Figure 3A:
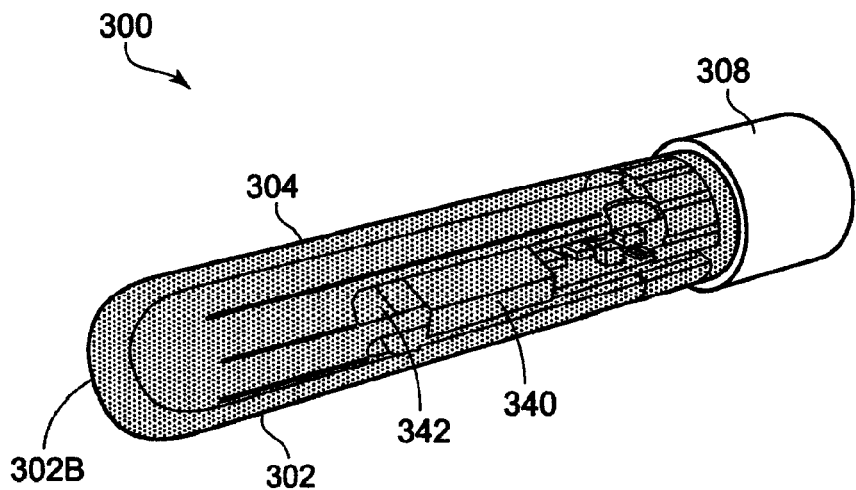
FIG. 3A is a side perspective view of an exemplary sensor device in accordance with a third embodiment.
Figure 3B:
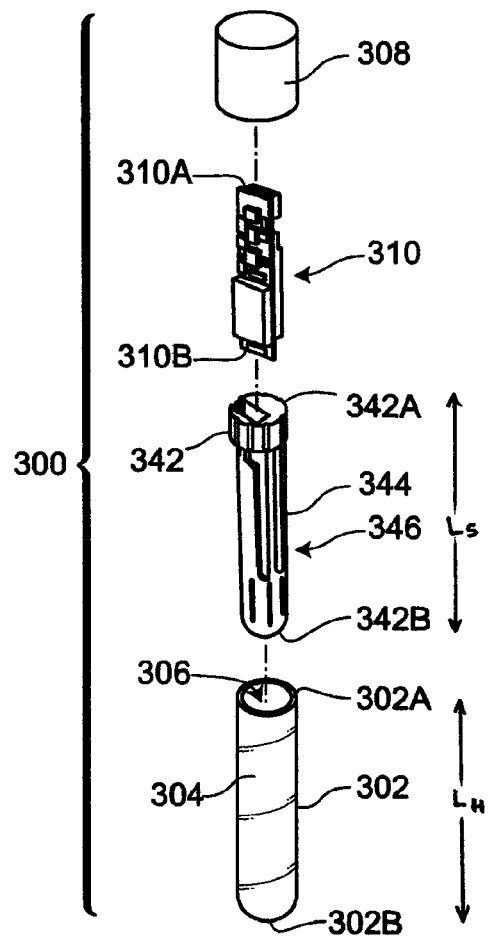
FIG. 3B is an exploded view of the exemplary sensor device of FIG. 3A.

FIGS. 3A and 3B illustrate an exemplary sensor device, referred to generally as 300, in accordance with a third embodiment. The sensor device 300 shown in FIGS. 3A and 3B is similar to the sensor device 100 shown in FIGS. 1A-1D, except that the sensor device 300 includes a spacer 342. Elements having similar structure and/or performing similar function as those in the sensor device 100 of FIGS. 1A-1D are numbered similarly, with the reference numerals incremented by 200.

Referring to FIG. 3B, the spacer 342 has a first spacer end 342A and a second spacer end 342B opposite the first spacer end 342A. A length $L_S$ of the spacer 342, measured between the first and second spacer ends 342A and 342B may be equal to or slightly smaller than a length $L_H$ of the housing 302, measured between the first and second housing ends 302A and 302B. In this way, when fully inserted into the inner space 306, the second spacer end 324B is proximate to (and optionally supported by contact with) second housing end 302B and the first spacer end 342A is proximate to the first housing end 302A.

The sensor assembly 310 is positionable along the length of the spacer 342 to suitably position the sensor assembly 310 within the inner space 306. The spacer 342 may be made from a resilient material, such as a plastic material, to simplify positioning the spacer 342 around the sensor assembly 310. In the illustrated example, the spacer 342 includes a slit 344 extending longitudinally from the first spacer end 342A toward the second spacer end 342B. The longitudinally extending slit 344 defines a receiving slot 346 configured to receive the sensor assembly 310 therein. Accordingly, spacer 342 surrounds sensor assembly 310.

The sensor assembly 310 can be positioned within the receiving slot 346 along the longitudinally extending slit 344. The internal dimension of the spacer 342 may be expanded by deformation of the spacer 342 along the longitudinally extending slit 344. Temporary deformation of the internal dimension may simplify positioning the sensor assembly 310 along the slits 344.

Sensor assembly 310 may be rigidly connected to spacer 342. For example, a retaining force may be applied to the sensor assembly 310 from opposite sides of the longitudinally extending slit 344 that holds the sensor assembly 310 in position. In effect, the sensor assembly 310 may be sandwiched between opposing sides of the longitudinally extending slit 344. Alternatively or in addition, spacer 310 may be connected to sensor assembly 310 by clips, snaps, fasteners, or adhesive. When sensor assembly 310 is connected to spacer 310, spacer first end 342A may be proximate sensor assembly first end 310A, and spacer second end 342B may be proximate sensor assembly second end 310B.

In some embodiments, first spacer end 342A may be shaped to generally match the cross-sectional shape of the housing 302. For example, spacer 342 may be sized to snugly fit within the inner space 306. Frictional engagement between the outer edge of the first spacer end 342A and the inner surface of the at least one outer wall 304 may improve the stability of the sensor assembly 310 within the inner space 306. For example, this frictional engagement may limit rotational slippage between the spacer 342 and the at least one outer wall 304. Similar to the sensor cap 124 of the sensor device 100 shown in FIGS. 1A-1D, the first spacer end 342A, may also limit and/or prevent the hardened substrate 340 from forming above or on the first sensor assembly end 110A.

The sensor assembly 310 can be positioned within the spacer 342 either before or after the spacer 342 has been inserted into the inner space 306. Spacer 342 may be rigidly connected to housing 302 in any manner. For example, once the sensor assembly 310 is positioned as desired within the housing, the substrate material can be added, e.g. as described above. Alternatively, the substrate material can be added to the housing 302 and then the spacer 342 and the sensor assembly 310 can be inserted together into the substrate material. In some embodiment, spacer 342 may be rigidly connected to housing 302 by discretely applied regions of adhesive (e.g. as opposed to submerging spacer 342 in a hardening substrate material), or by other mechanical means.

Optionally, in cases where an opaque hardened substrate portion 340 is used, the spacer 342 may be made of a translucent or see-through material. This may allow the sensor assembly 310 to been seen and monitored from the outside of the housing 302.

Figure 12:
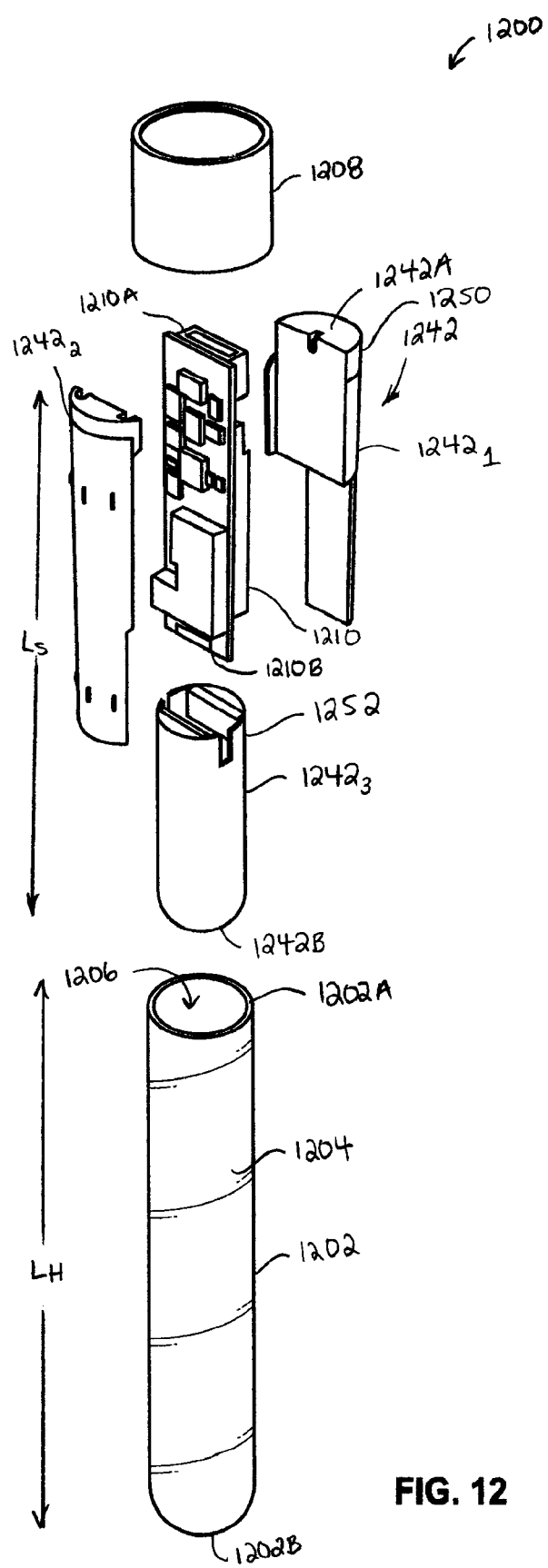
FIG. 12 is an exploded view of an exemplary sensor device in accordance with another embodiment.

FIG. 12 illustrates an exemplary sensor device, referred to generally as 1200, in accordance with another embodiment. The sensor device 1200 is similar to the sensor device 300 shown in FIGS. 3A-3B, except that the sensor device 1200 includes another embodiment of spacer 1242. Elements having similar structure and/or performing similar function as those in the sensor device 100 of FIGS. 1A-1D or 300 of FIGS. 3A-B are numbered similarly, with the reference numerals incremented to 12XX.

Spacer 1242 may be made of any number of discrete pieces, some or all of which may be assembled together before or after insertion into housing 1202. As an example, FIG. 12 shows a spacer 1242 that includes at least three pieces $1242_1$, $1242_2$, and $1242_3$. In other embodiment, spacer 1242 may have a one-piece design (e.g. integrally formed design), a two-piece design, or have four or more pieces. As shown, spacer pieces $1242_1$ and $1242_2$ may define first end 1242A of spacer 1242 and may flank (i.e. sandwich) sensor assembly 1210 along a longitudinal length of sensor assembly 1210. Spacer piece $1242_3$ may define second end 1242B of spacer 1242 and may receive sensor assembly second end 1210B.

In some embodiments, spacer 1242 may be rigidly connected to housing 1202. In such cases, spacer 1242 may be rigidly connected to housing 1202 in any manner. For example, spacer 1242 may be adhesively bonded to housing 1202, such as by adhesive, such as for example hot melt adhesive. In some embodiments, spacer 1242 may be bonded to housing 1202 by a hardened substrate. For example, spacer 1242 may be at least partially submerged in hardened substrate material within housing 1202.

Sensor assembly 1210 may be connected to spacer 1242 in any manner. For example, sensor assembly 1210 may be connected to spacer 1242 by friction (e.g. from compression between pieces $1242_1$ and $1242_2$), clips, snaps, fasteners, or adhesive.

When sensor assembly 1210 is connected to spacer 1242, and both sensor assembly 1210 and spacer 1242 are hermetically sealed in housing 1202 by container cap 1208, spacer 1242 may have a spacer first portion 1250 proximate sensor assembly first end 1210A and a spacer second portion 1252 proximate sensor assembly second end 1210B. This may permit spacer 1242 to stabilize sensor assembly 1210 along substantially an entire longitudinal length of sensor assembly 1210. Each of the spacer first portion 1250 and the spacer second portion 1252 may be rigidly connected to housing 1202 (e.g. by adhesive).

Figure 8:
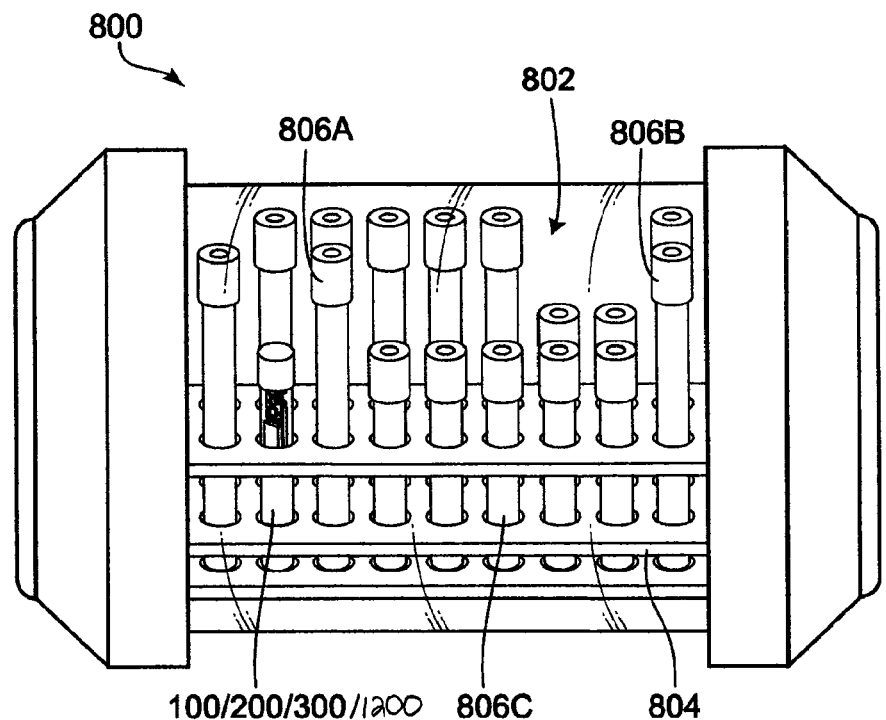
FIG. 8 is a side perspective view of an example carrier for use in a pneumatic tube system showing a plurality of samples stored therein.

Turning to FIG. 8, an example carrier 800 is illustrated for a pneumatic tube system (PTS). The carrier defines an inner space 802. A support rack 804 is fixedly positioned within the inner space 802. PTS are common in hospitals and medical centers for efficiently transporting biological samples to other areas within the hospital (e.g. for testing). PTS forces (e.g. air pressure and vacuum) act upon the carrier 800 to alternately push and pull the carrier through a tubular pathway from a start location to a destination location (optionally the carrier may be temporarily held at holding points). As a result, the quality of the blood samples transported within the carrier 800 can be diminished and may result in pre-analytical errors like hemolysis and an increase in analyte concentration such as potassium.

As shown, a plurality of vials containing blood samples (e.g. 806A and 806B) are positioned in the support rack 804. At least one of the sensor devices 100, 200, 300, and 1200 shown in FIGS. 1A-1D, 2A-2B, 3A-3B, and 12 respectively, or a combination thereof, may be positioned in the support rack 804. The sensor device 100/200/300/1200 is transported along with the plurality of vials in the carrier 800. Due to its proximate position to the vials (e.g. vials 806A and 806B), its configuration that generally matches the configuration of the vials and optionally its weight that approximates a combined weight of the vial and the blood stored therein, the sensor device 100/200/300/1200 may detect at least one transport parameter analogous or comparable to that transport parameter experienced in the vials (e.g. vials 800A-800B) during transportation. As described above, the at least one transport parameter may include acceleration, temperature, orientation, etc.

The transportation data collected by the sensor devices 100/200/300/1200 can inform when maintenance is required on PTS and/or the setting (or optimization) of PTS parameters, such as speed and pressure within the tube system. As described above, the transportation data can allow an individual receiving the sample (e.g. a lab technician, analyst, or the like) to assess a quality of the sample. With this information, the individual may determine that a sample is at risk of damage, or is compromised, and may elect to discharge or throw away the sample if one of the transport parameters detected by the sensor device 100 is outside an acceptable range.

In some cases, a plurality of sensor devices 100/200/300/1200 may be included in the carrier 800 during transportation. In such cases, the transportation data collected by the plurality of sensor devices may be averaged by the number of sensor devices.

In the illustrated example, vials 806A and 806B contain different volumes of blood. In such cases, the sensor device 100/200/300/1200 may have a weight that approximates an average combined weight of the two vials 806A and 806B with the samples respectively stored therein. Alternatively, in this case, two sensor devices 100/200/300/1200 may be used; one that approximates a combined weight of vial 806A and the sample stored therein and another that approximates a combined weight of vial 806B and the sample stored therein.

In the illustrated example, vials 806A and 806C have different configurations (i.e. vial 806C is smaller than vial 806A). In such cases, two sensor devices 100/200/300/1200 may be used; one that has a configuration that generally matches the configuration of vial 806A and another that has a configuration that generally matches the configuration of vial 806B.

Figure 9:
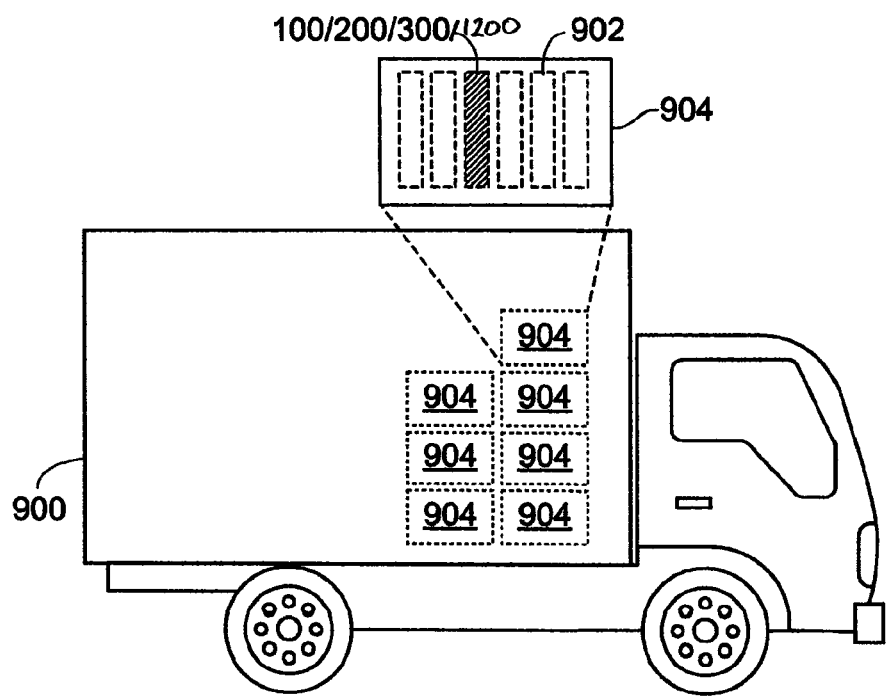
FIG. 9 shows an example truck with a plurality of samples stored therein for transportation.

Turning to FIG. 9, an example truck 900 is illustrated which is used to transport samples over a transportation network (e.g. highways, roads and the like from a collection site to a testing site). For example, the truck 900 may be loaded with a plurality of containers 902 with each container having a sample stored therein. The truck 900 may be one of many uses for the sensor devices 100, 200, 300, and 1200 shown in FIGS. 1A-1D, 2A-2B, 3A-3B, and 12, respectively. In the illustrated example, the plurality of containers 902 are packed within a box or case 904 prior to being loaded into the truck 900. As shown, each truck 900 may be loaded with a plurality of boxes 904. It will be understood that the truck 900 may also be a car, a bike or another form of transportation.

At least one of the sensor devices 100, 200, 300, and 1200 shown in FIGS. 1A-1D, 2A-2B, 3A-3B, and 12, respectively, or a combination thereof, may be positioned proximate to the containers 902 within the box 904 during transportation. Due to its proximate position to the containers 902, its configuration that generally matches the configuration of the containers 902 and optionally its weight that approximates a combined weight of the container 902 and the sample stored therein, the sensor device 100/200/300/1200 can detect at least one transport parameter representative of that at least one transport parameter of the containers 902 during transportation. As described above, the at least one transport parameter may include acceleration, orientation, temperature, etc.

The at least one transport parameter can allow an individual receiving the sample (e.g. a lab technician, analyst, or the like) to assess a quality of the sample. With this information, the individual may elect to discharge or throw away the sample if one of the transport parameters detected by the sensor device 100 is outside an acceptable range. The at least one transport parameter detected by the sensor devices 100/200/300/1200 can also provide for an assessment of the transportation network, be used to improve the transportation network (e.g. during times of abnormally high stress) and/or ensure that the transportation network is operating at levels that have been determined to be acceptable or non-damaging to the sample.

Figure 4:
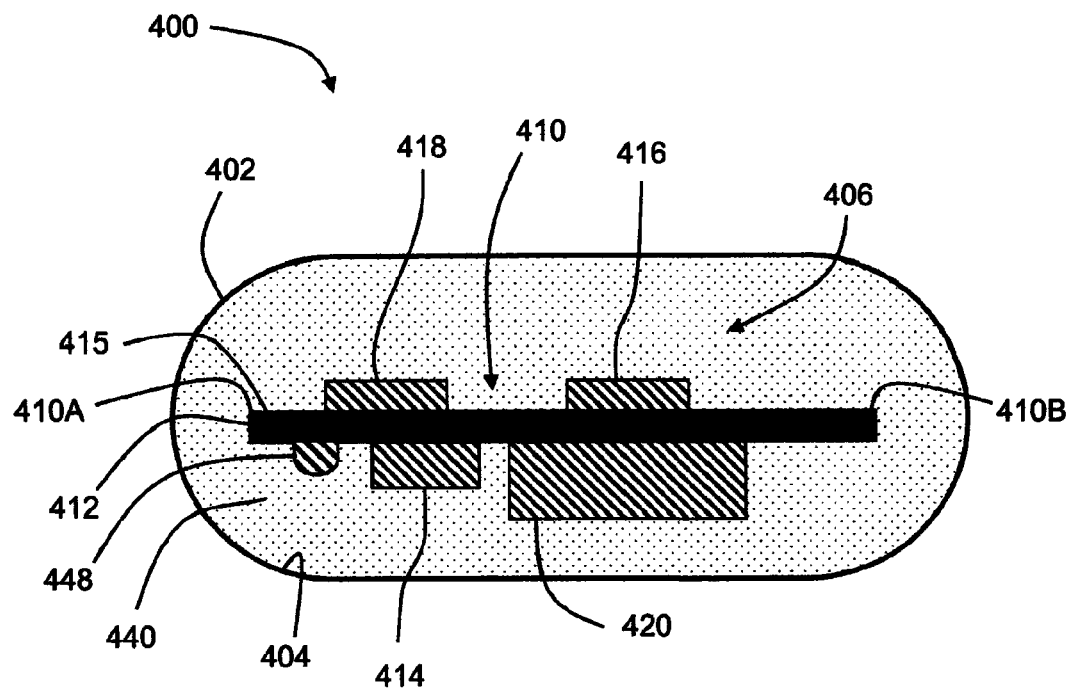
FIG. 4 is a cross-sectional view of an exemplary sensor device in accordance with a fourth embodiment.

FIG. 4 illustrates an exemplary sensor device, referred to generally as 400, in accordance with a fourth embodiment. The sensor device 400 can detect transport parameters to which a drug product or other object is subjected during transportation or during motion, such as during mixing motion or in motion on a conveyor. The drug product is optionally a pharmaceutical dosage form, such as pills, capsules, tablets, or the like. In some cases, the motion is the drug product in motion (e.g. rotating) in a mixer with other samples. For example, the mixer may be a drug product coating mixer such as a mixing drum for coating pharmaceutical pills, capsules or tablets with a coating (wet or dry coating), such as a film, a protective coating, color coating, enteric coating (e.g. delayed release), or a coating to facilitate administration of drug product to a subject, such as to facilitate swallowing or other insertion in a subject's body.

The sensor device 400 is positionable proximate the drug product such that it is subjected to representative or comparable transport parameters as the drug product during transportation. In some cases, the sensor device 400 is proximate in the sense that it is in the same mixer, conveyor, or other similar devices as the drug product. The sensor device 400 and a drug product are still considered to be proximate whether they are stationary in the mixer or whether they are moving relative to one another in the mixer.

The sensor device 400 may be added to a batch of drug products (e.g. pills, tablets or the like) prior to that group of drug products being put through a mixing and/or coating process. For example, the sensor device 400 is positionable proximate the drug product in a device, such as a mixing drum, for coating with a plurality of drug products. Optionally, there is about 100 to 1000 drug products per coating process. Accordingly, due to its proximate position, the sensor device 400 can accurately detect transport parameters to which the drug product is subjected during the mixing and/or coating process.

In this embodiment, the reference herein to detecting transport parameters to which the object (e.g. the drug product) is subjected during the mixing and or coating would be understood by a skilled person to indicate that the detected transport parameters are optionally considered to be typical transport parameters comparable to those that would be experienced by a drug product in the mixer. It is readily apparent that different drug products will experience slightly different transport parameters depending on factors at any given time such as a particular drug product's orientation, position relative to neighboring drug products that are impacting it, and position in the mixer (e.g. located in the top or bottom of a mass of pills in the mixer). The present embodiment of the sensor device 400 optionally detects the transport parameters at any given moment, but is also capable of detecting the transport parameters over the course of the mixing process or at a plurality of intervals (e.g. either time points or time periods) in the mixing process. The sensor device 400 taking measurements of transport parameters during at least a plurality of intervals in the mixing process is useful to optionally determine a drug product transport parameter (or set of drug product transport parameters) that is considered representative or comparable to the forces typically experienced by the drug product in the mixer, conveyor, etc.

During mixing or coating, the relative distance and/or orientation between the sensor device 400 and the proximate objects (e.g. pills, capsules and the like) varies over the course of the process due to the mixing or coating process moving the device and objects into different directions and/or orientations within the mixer. The transport parameters experienced by the sensor device 400 in mixing or coating are typical of those experienced by the objects over the course of the process, but at any individual time point, the device and objects are experiencing individual transport parameters that will typically differ from object to object at that individual time point. Typically, each sensor device 400 and object will experience its own unique transport parameters during the mixing or coating because the sensor device 400 and objects are not secured in relative locations and orientations. One of skill in the art would appreciate that the sensor device 400 is measuring transport parameters that are not directly representative of any one object, but are typical of those experienced by an object (optionally, in some cases, representing an average or approximation over time of the typical forces experienced by an object).

Similarly, during conveying (e.g. on a conveyor belt as loose objects or in a package (e.g. drug bottle, candy container) or during shipping), the relative distance or orientation between the sensor device 400 and the proximate similar objects may either vary or be generally similar, depending on how the conveyor is arranged to operate by one of skill in the art.

The sensor device 400 includes a housing 402, a sensor assembly 410 positioned within the housing, and a hardened substrate portion 440 securing the sensor assembly 110 within the housing 402. Optionally, the housing 402 has a configuration (e.g. shape and/or size) generally matching the configuration of the drug product, such as a pill, capsule, tablet or the like.

The housing 402 is optionally a casing. In some cases, the housing 402 may have a different shape than the drug product. In some cases, the housing 402 may be formed by a 3D printer, molding, or other manufacturing process known in the art. The housing 402 has a first housing end 402A and a second housing end 402B opposite the first housing end 402A. The housing 402 includes at least one outer wall 404 extending between the first housing end 402A and the second housing end 402B. The at least one housing wall 404 may define an inner space or cavity 406.

In the illustrated example, the housing 402 is generally capsule-shaped or tablet-shaped so that it may generally match a capsule-shaped or tablet-shaped drug product or dosage form. It will be understood by those skilled in the art that the housing 402 may have other suitable configurations based on the configuration of the drug product to which it generally corresponds or matches. In some cases, the sensor device 400 may have a configuration (e.g. size and shape) and/or weight that generally matches the configuration and a weight of the drug product (e.g. optionally less than: 30%, 15%, 10%, 5% or 1% variance in dimensions, volume and/or weight). For example, optionally the weight of the sensor device 400 is within plus or minus 10% or 20% of the typical weight of a drug product. If 1 gram is the average weight of a drug product, then optionally the weight of the sensor device 400 is within plus or minus: 20% or 10% of the 1 gram average weight of the drug product.

The hardened substrate portion 440 may optionally be a cast or cured substrate portion 440. The hardened substrate portion 440 may comprise a number of suitable substrate materials, e.g. epoxy, silicon, polyamide, polyester etc., whether transparent, translucent, or opaque.

The sensor assembly 410 is at least partially encapsulated within the hardened substrate portion 440. In this arrangement, the sensor assembly 410 is secured within the housing by the hardened substrate portion 440. This arrangement advantageously provides for a robust sensor device 400 in which the sensor assembly 410 may be protected from user abuse and/or tampering by the hardened substrate portion 440. With the sensor assembly 410 at least partially encapsulated within the hardened substrate portion 440, spurious movements of the sensor assembly 410 within the housing 402 may be limited and/or prevented. Not only can limiting spurious movements provide for improved results, it may also increase the lifespan of the sensor device 400. For example, the hardened substrate portion 440 may act to waterproof the sensor assembly 410 as well as protect it from shock, extreme temperatures, drops and/or corrosion.

In the illustrated example, the sensor assembly 410 is fully encapsulated by the hardened substrate portion 440 to improve stability. Optionally, as shown in the illustrated example, the hardened substrate portion 440 substantially fills in the inner space 406 surrounding the sensor assembly 410 to further improve stability.

The sensor assembly 410 includes at least one sensor 414 for detecting at least one transport parameter, e.g. acceleration, orientation, temperature, etc. The sensor assembly 410 has a first sensor assembly end 410A and a second sensor assembly end 410B opposite the first sensor assembly end 410A. The sensor assembly 410 can be positioned at any suitable location within the inner space 406 of the housing 402. For example, in some cases, the first sensor assembly end 410A may abut the at least one outer wall 404 at the first housing end 402. In the illustrated example, the sensor assembly 410 is positioned so that it is centrally aligned between the first and second housing ends 402A and 402B.

As described above, the sensor assembly 410 is at least partially potted or encapsulated in an epoxy, silicon, polyamide, polyester or other suitable substrate material, which hardens to form the hardened substrate portion 440. This arrangement limits movement of the sensor assembly 410 relative to the housing 402 and, in response, can improve the accuracy of the at least one transport parameter detected by the at least one sensor 414 and/or protect the sensor assembly 410 from damage.

In some cases, the substrate material is added to the housing 402 after the sensor assembly 410 is positioned therein. However, in other cases, the substrate material may be added to housing 402 before the sensor assembly 410. In such cases, the sensor assembly 410 is at least partially inserted into the substrate material that has been added within the inner space 406. The substrate material may be added to the inner space 406 in a number of suitable ways. For example, a syringe may be used to inject the substrate material into the inner space 406 through a small insertion hole (not shown) defined through the outer wall 404 of the housing 402. After injecting the substrate material, the small insertion hole can be sealed.

As described above, the hardened substrate portion 440 typically waterproofs the sensor assembly 410. The position of the sensor assembly 410 within the inner space 406 is adjustable before the substrate material hardens. Once the substrate material has been added to the housing 402 it may take some time to set. For example, the substrate material may take about an hour to set and about 10 hours to harden. The substrate material preferably does not expand or contract while hardening and/or setting. In some cases, the substrate material may be thermally conductive. If the at least one sensor 414 comprises a temperature sensor, the thermally conductive substrate material may improve the response time and/or accuracy of the temperature sensor.

Pharmaceutical manufacturing processes typically spin drug products in a drum for thorough mixing and/or coating, but these processes must not spin with a force that breaks or damages the drug products. For example, the sensor device 400 can detect vibration during mixing, to help assess mixing efficiency and adjust (or optimize) mixing parameters. In some cases, at least one transport parameter detected by the at least one sensor 414 can inform the setting of mixing parameters that provide efficient mixing and/or coating without damaging the drug product (i.e. capsule, pills, tablets and the like). For example, transportation data may be collected from runs of 1-60 minutes, 5-30 minutes or about 10-20 minutes.

The sensor device 400 is optionally the size and shape of a pharmaceutical dosage form, e.g. such as tablets or pills, to be swallowed typically ranging from about 2, 3 or 4 millimeters to 1 centimeter. The sensor device 400 is optionally of similar or identical configuration, weight and/or density of a drug product that is undergoing mixing and/or coating. In this way, the sensor device 400 may respond to forces (e.g. experienced during mixing and/or coating) in a similar way as the drug product. In some cases, the sensor device 400 is 3.5 cubic centimeters or smaller.

In one or more alternative embodiments, the sensor device 400 may be larger than a typical dosage form. In such cases, the sensor device 400 may have a thickness around 10 mm. The sensor device 400 optionally has overall dimensions of about 15×40×10 mm and a volume of 6 cubic centimeters. A larger sensor device 400 is optimally around 8 cubic inches.

With continued reference to FIG. 4, the sensor assembly 410 also includes a controller 416 coupled to the at least one sensor 414, and an energy storage module 418 (e.g. a battery) to energize the controller 416. In the illustrated example, the at least one sensor 414 and the controller 416 and the energy storage module 418 are mounted on a circuit board 412. The circuit board 412 couples the at least one sensor assembly 414, the controller 416, and the energy storage module 418.

In the illustrated example, the at least one sensor 414 includes a plurality of sensors that include a 3-axis accelerometer, a 3-axis gyroscope, a 3-axis magnetometer, a temperature sensor, a humidity sensor, a light sensor, and/or a GPS tracker. It will be appreciated that in one or more alternative embodiments, the sensor assembly 410 may include different combinations of the above-noted sensors. The 3-axis accelerator sensor captures data related to vibrations and acceleration. The 3-axis gyroscope and the 3-axis magnetometer may capture data related to the orientation. The GPS tracker may capture data related to the location of the drug product. The light sensor may detect light intensity, while the temperature and humidity sensors detect temperature and humidity, respectively.

Optionally, the at least one sensor 414 is rated up to 85, 90 or 100 degrees Celsius. In some cases, the 3-axis gyroscope tops out at +/−2000 degrees per second or 5.6 revolution per minute. In other cases, the 3-axis gyroscope tops out at 1000, 2500 or 3000 degrees per second. The 3-axis accelerometer optionally measures up to +/−16, 25 or 35 g (1 g=9.8 metres per second squared). Optionally, the 3-axis magnetometer detects magnetic flux density within a range of plus or minus 1,200 microTesla.

In some cases, the controller 416 is configured to track an elapsed time during mixing and/or coating (e.g. the time the drug product spends in the mixer or on the conveyor belt). The elapsed time tracking capability of the controller 416 together with other transport parameters detected by the at least sensor 414 can provide for an assessment of the coating and/or mixing process. The at least one transport parameter may also provide for a comparison between alternative mixing parameters (e.g. mixing speeds, temperatures, durations, etc.) to adjust (or optimize) the mixing and/or coating process.

In some cases, the controller 416 is configured to track real-time during transportation. For example, the controller 416 may start tracking real-time at the beginning of motion (i.e. when entering the mixer) and then stop tracking real-time at the end of motion (i.e. when the mixing cycle has ended). Optionally, real-time may be tracked down to the nanosecond. The at least one transport parameter detected by the at least one sensor 414 can be paired or associated with the tracked real-time by the controller 416. This may provide for an assessment of the change in the at least one transport parameter over time. For example, this information may be valuable in making decisions on whether to alter mixing parameters and/or schedules.

In the illustrated example, the sensor assembly 410 also includes a wireless transmitter or antenna 415. For example, the wireless transmitter 415 may include at least one of a Wi-Fi module, a Bluetooth module and a NFC module configured to couple the controller 416 to a peripheral device and/or server, e.g. a database, a laptop, a smart phone, a flash drive, etc. In such embodiments, the controller 416 may transmit the at least one transport parameter detected by the at least one sensor 414, for example, to cloud-based storage and/or a user's smart phone. This may be done continuously in real-time or at the end of, for example a mixing and/or coating process. Accordingly, this may permit the at least one transport parameter (e.g. temperature, acceleration, etc.) to be monitored as the drug product is mixed and/or coated. In some cases, transportation data is downloaded from the sensor device 400 every 1-60 minutes. In other cases, transportation data is downloaded for the sensor device 400 every 1-12 hours, or optionally every 4-8 hours.

In the illustrated example, the sensor assembly 410 also includes a memory module 420 coupled to the controller 416. The memory module 420 is configured to store the at least one transport parameter detected by the at least one sensor 414. The memory module 420 can include RAM, ROM, one or more flash drives or some other suitable data storage elements such as disk drives, etc. As shown, the memory module 420 may be coupled to the controller 416 via the circuit board 412. The controller 416 can instruct the memory module 420 to write and/or retrieve data. In some cases, the memory module 420 can store the at least one transport parameter detected by the at least one sensor in real-time during a mixing and/or coating process. In cases where the transportation data is transmitted in real-time to a peripheral device and the wireless signal is lost or interrupted, e.g. between the Bluetooth module and the server, the memory module 420 can serve as a safeguard against the loss of transportation data. A peripheral device may access the transportation data from the memory module 420 wirelessly via the wireless transmitter 415.

In some cases, a weight of the sensor device 400 approximates a weight of the drug product (e.g. the weight of a pile or capsule). Optionally, the weight of the sensor device 400 is optionally about 70 to 130% of the weight of the drug product. Preferably, the weight of the sensor device 400 is about 90 to 110% of the weight of the drug product. Due to the weight approximation, when the sensor device 400 is positioned proximate the drug product during a mixing and/or coating process, the at least one sensor 414 experiences acceleration and/or vibrational forces that are representative of those experienced by the drug product.

The weight of the sensor device 400 is optionally adjusted by adjusting a weight of the cured substrate portion 440. For example, to adjust the weight of the sensor device 400, a volume or quantity of the substrate material added to the housing may be adjusted. In the illustrated example, the substrate material is epoxy. Accordingly, more or less of the epoxy can be added to the inner space 406 of the housing 402 to respectively increase or decrease the weight of the hardened substrate portion 440.

In some cases, the substrate material includes a filler or additive. The filler and substrate material may be mixed together prior to be added to the housing 102. Optionally, the substrate material and the filler are homogenously mixed. The filler may be added to adjust the density of the hardened substrate material 440 so that the weight of the sensor device 400 approximates the weight of the drug product. For example, adding a filler to the substrate material to decrease the overall density of the hardened substrate material 440 may allow the hardened substrate portion 440 to occupy a greater volume of the inner space 406 within the housing 402. This may allow the hardened substrate portion 440 to better protect and/or immobilize the sensor assembly 410. In such examples, the filler may be characterized as a "density-reducing filler".

In the illustrated example, hollow glass-microspheres are added to the epoxy to decrease the density of the hardener substrate portion 440 surrounding the sensor assembly 410. Other suitable fillers may be used to adjust the density and/or volume of the hardened substrate portion 440, e.g. plastic microspheres, silica, metallic fibers, etc. In one or more alternative embodiments, plastic microspheres or silica may be added to the epoxy to increase the density of the hardened substrate portion 440. In such embodiments, the filler may be characterized as a "density-increasing filler".

The weight of the drug product or pharmaceutical dosage form (e.g. a tablet or a capsule) is either known or measured before adding the substrate material to the inner space 406 of the housing 402. Once the weight of the drug product has been determined, a suitable amount of the substrate material (optionally, a mixture of the substrate material and filler) may be added to the inner space 406 so that the weight of the sensor device 400 approximates the weight of the drug product.

As noted above, in the illustrated example, the hardened substrate portion 440 comprises an epoxy and hollow glass microsphere. In this way, the weight of the hardened substrate portion 440 may be adjusted by varying the relative weight proportions of the epoxy (the substrate material) and hollow glass microspheres (the filler).

By approximating the weight of the drug product, the at least one sensor 414 positioned within the housing 402 responds to forces in a similar way as the drug product, e.g. during mixing and/or coating. Force equals mass times acceleration; therefore, if a sensor device has a substantively different mass than the weight of the drug product, the transport parameters (e.g. acceleration) detected may not accurately reflect what the drug product is experiencing. Accordingly, when the sensor device 400 is positioned proximate the drug product, e.g. during mixing and/or coating, it allows for detection of transport parameters (e.g. acceleration, orientation, temperature, etc.) that are representative or similar to those which the drug product is subjected.

As noted above, the hardened substrate portion 440 may be transparent, translucent, or opaque. Alternatively, the hardened substrate portion 440 may be further divided into sub portions each having different properties. Optionally, when the hardened substrate portion 440 is transparent or translucent, the sensor assembly 410 may include a status light 448, such as an LED light or the like, coupled to the controller 416. As shown, the status light 448 may be mounted on the circuit board 412. The status light 448 may indicate a number of warnings or cautions, such as low battery, maintenance required, etc. It may also indicate whether the sensor device 410 is on or off. In some cases, the LED light 448 may light up or flash if a programmed threshold had been exceeded, e.g. an acceleration or temperature threshold.

In or more alternative embodiments, the housing 402 is formed from a hardened substrate material. The substrate material used to form the housing 402 may be the same substrate material used to form the hardened substrate portion 440. In such embodiments, the housing 402 may be integrally formed with the hardened substrate portion, e.g. by low-pressure over molding or a similar molding process.

Figure 5:
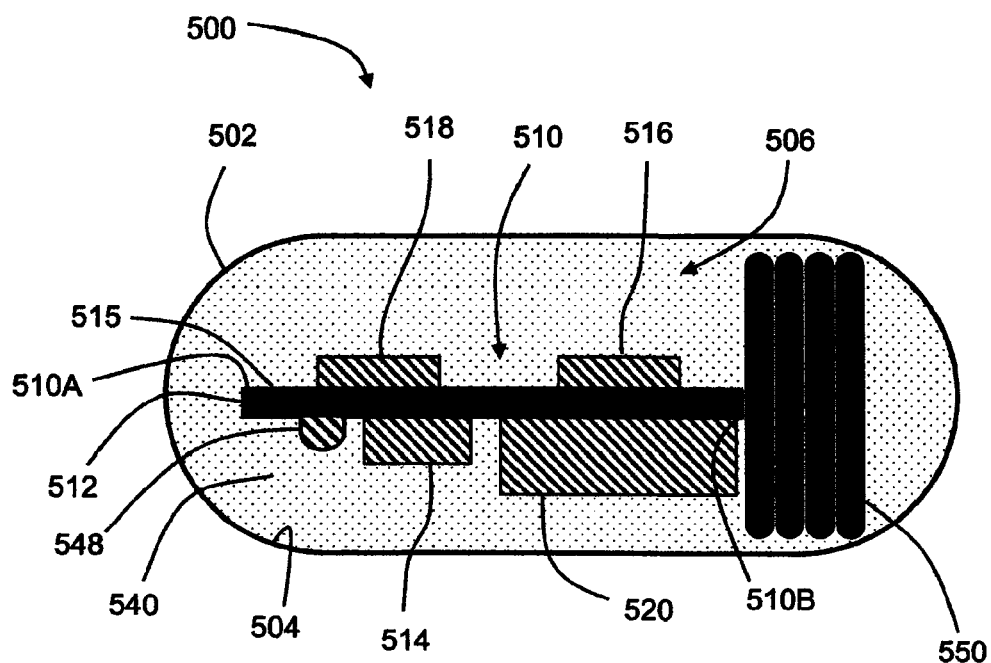
FIG. 5 is a cross-sectional view of an exemplary sensor device in accordance with a fifth embodiment.

FIG. 5 illustrates an exemplary sensor device, referred to generally as 500, in accordance with a fifth embodiment. The sensor device 500 shown in FIG. 5 is similar to the sensor device 400 shown in FIG. 4, except that the sensor assembly 510 includes an energy transfer coil 550. Elements having similar structure and/or performing similar function as those in the sensor device 400 of FIG. 4 are numbered similarly, with the reference numerals incremented by 100.

The energy coil 550 may be used to charge or recharge the energy storage module 518. Energy may be transferred from the energy coil 550 to the energy storage module 518. In the illustrated example, the energy coil 550 is positioned at the second assembly end 510B and coupled to the energy storage module 518 through the circuit board 512. In alternative embodiments, the energy coil 550 may be positioned elsewhere on the sensor assembly 510 and/or coupled differently to the energy storage module 518.

The energy coil 550 is wireless in a sense that it does not draw power through a wired-correction to an external energy or power source. In the illustrated example, the energy coil 550 may draw energy from an inductive wireless power transmission device (not shown). Inductive charging is a type of wireless charging that uses an electromagnetic field to transfer energy between two objects through electromagnetic induction. In such example, the energy coil 550 may draw energy when the sensor device 500 is positioned on and/or near a charging station that comprises the inductive power transmission device therein.

Figure 6:
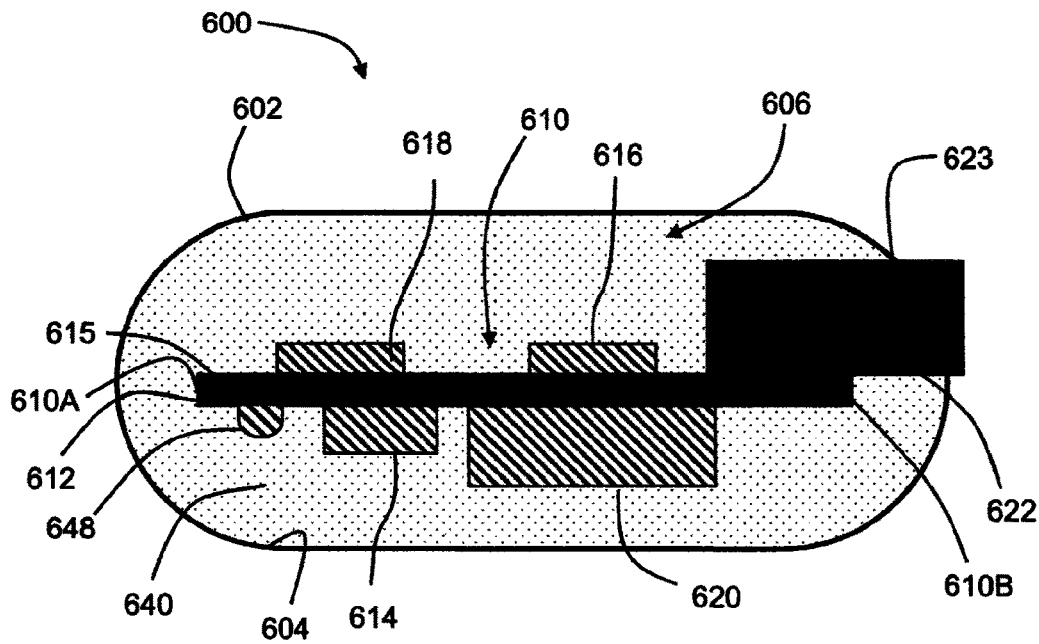
FIG. 6 is a cross-sectional view of an exemplary sensor device in accordance with a sixth embodiment.

FIG. 6 illustrates an exemplary sensor device, referred to generally as 600, in accordance with a sixth embodiment. The sensor device 600 shown in FIG. 6 is similar to the sensor device 400 shown in FIG. 4, except that the sensor assembly 610 includes a connection hub 622. Elements having similar structure and/or performing similar function as those in the sensor device 400 of FIG. 4 are numbered similarly, with the reference numerals incremented by 200.

The connection hub 622 may include at least one of USB, UART, FTDI, JTAG, SPI, 12C communication interfaces, or a combination thereof. In the illustrated example, the connection hub 622 is positioned at the second assembly end 6106 and coupled to the controller 616 and/or the energy storage module 618 through the circuit board 612. In alternative embodiments, the connection hub 622 may be positioned elsewhere on the sensor assembly 610 and/or coupled differently to the controller 616 and/or the energy storage module 618. The connection hub 622 extends from the at least one outer wall 604 and is accessible from outside the housing 602. In the illustrated example, the connection hub 622 protrudes from an aperture 623 defined in the at least one outer wall 604 of the housing 602. This arrangement may permit a peripheral device (not shown) to be coupled to the sensor assembly 610 via the connection hub 622. In this way, the peripheral device (e.g., smart phones, laptops, tablets, flash drives and the like) may retrieve the transportation data stored in the memory module 620 via a cable or the like that is coupled to the connection hub 622.

Furthermore, the connection hub 622 may be used to charge the energy storage module 618 via a wired-connection to an external power source, e.g. a power outlet or a peripheral device, such as a smart phone or tablet. In such embodiments, energy may be transferred from the external power or energy source to the energy storage module 618 via the connection hub 622.

The sensor devices 400, 500 and 600 shown in FIGS. 4, 5 and 6, respectively, may alternatively be used to detect transport parameters during transportation or motion (e.g. conveying or mixing during coating, such as coating with a film) of a food product, such as candy, mints, cereal (e.g. coated candy, coated mints or coated cereal), and the like.

Figure 10:
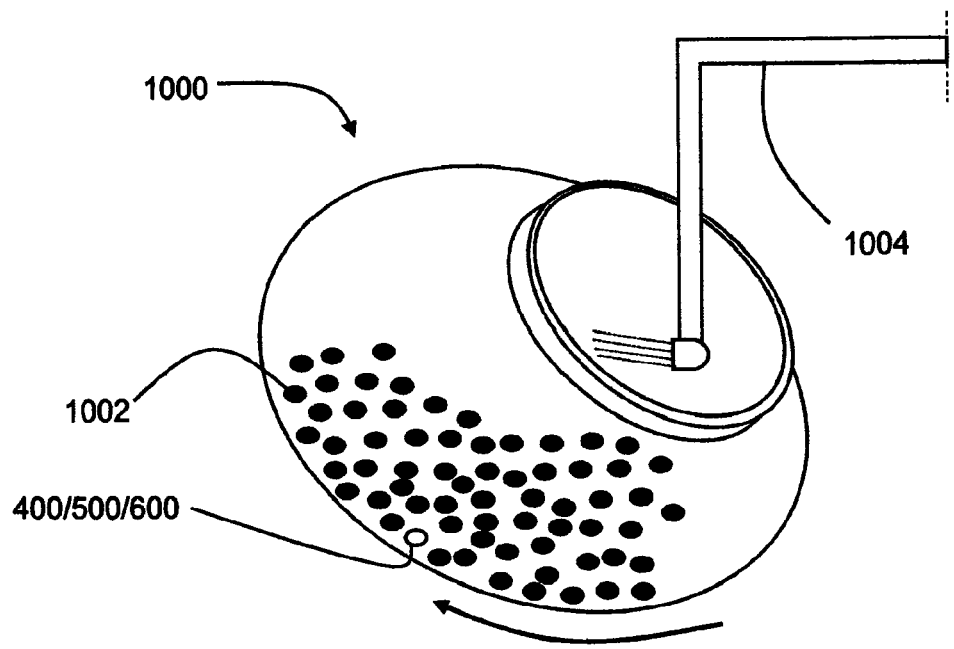
FIG. 10 shows an example mixing drum with a plurality of capsules loaded therein for coating.

Turning to FIG. 10, an example mixing drum 1000 is illustrated which is used to apply a coating to a plurality of capsules 1002 (optionally other drug products or food products). The mixing drum 1000 may be as one of many uses for the sensor devices 400, 500 and 600 shown in FIGS. 4, 5 and 6, respectively. The mixing drum 1000 rotates (e.g.

counterclockwise in this case) as a coating material is typically sprayed into the interior of the mixing drum 1000 through a supply line 1004 (alternately a bath or other immersion reservoir may be used for coating). At least one of the sensor devices 400/500/600, or a combination thereof, may be included with the plurality of capsules 1002 as they are loaded into the mixing drum 1000. Due to its position relative to capsules 1002 within the mixing drum 1000, its configuration that generally matches a configuration of the capsules 1002, and optionally its weight that approximates a weight of the capsules 1002, the sensor device 400/500/600 can detect at least one transport parameter representative of the capsules 1002 throughout the coating process.

As described above, the at least one transport parameter may include acceleration, temperature, orientation, etc. For example, the at least one transport parameter detected can inform the setting of mixing parameters (e.g. rate of rotation, temperature, etc. of the mixing drum 1000) that provides efficient coating without damaging the capsules 1002. As explained above, the sensor device 400/500/600 in this embodiment is measuring transport parameters that one of skill in the art would appreciate are representative of typical parameters experienced by capsules 1002 (e.g. drug product sample) in the mixing drum 1000, since each capsule 1002 is in a slightly different position and orientation in the mixer at any given moment during mixing. Therefore, if the sensor device 400/500/600 is measuring the transport parameters at a plurality of different time points, the sensor device 400/500/600 is collecting a set of typical transport parameters that are representative of the transport parameters experienced by a typical capsule 1002 in the mixing drum 1000.

In some cases, a plurality of sensor devices 400/500/600 may be included. In such cases, the transportation data collected by the plurality of sensor devices may be averaged based on the number of sensor devices.

Figure 7:
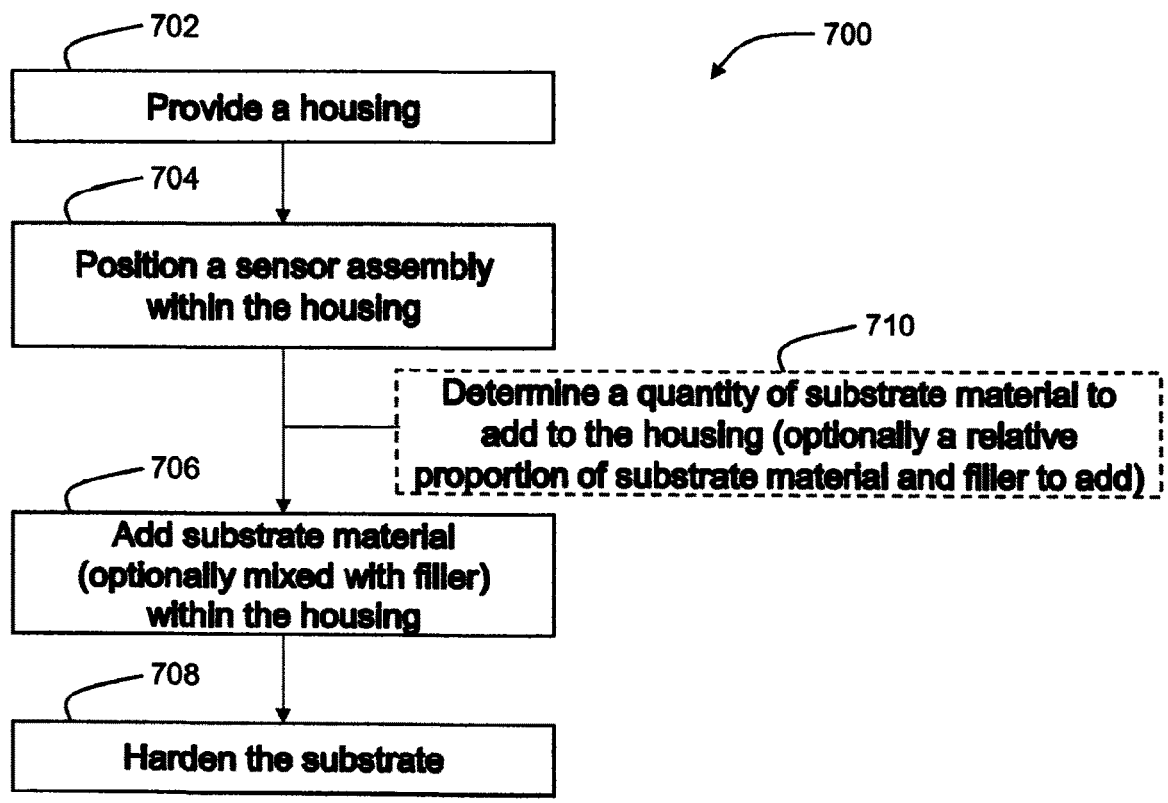
FIG. 7 is a flowchart of an exemplary method of making any one of the exemplary sensor devices of FIGS. 1-6.

Referring to FIG. 7, illustrated therein is a flowchart of an exemplary method 700 of a making a sensor device. The exemplary method 700 may be used to make any one of the sensor devices 100, 200, 300, and 1200 shown in FIGS. 1A-1D, 2A-2B, 3A-3B, and 1200 respectively.

At 702, a housing with a configuration (e.g. shape, size and/or weight) that generally matches the configuration of the container is provided. The container may be formed of plastic, glass, or another suitable material. In some cases, the container may be a vial, a test tube, or the like designed to hold a sample therein. The sample may be blood, urine, or another biological sample for the purposes of testing. In such cases, providing the housing may entail providing the same or similar container used to hold the sample. For example, this may entail providing an empty vial that is the same or similar to the vial used to store the sample.

At 704, a sensor assembly is positioned within the housing. It will be understood that the sensor assembly may have the same or similar elements as the sensor assemblies 110, 210, 310, and 1200 described above with reference to FIGS. 1A-1D, 2A-2B, 3A-3B, and 12, respectively. In some cases, the housing may be a tubular housing with an open first end and a closed and rounded second end. In such cases, the sensor assembly may be inserted into the housing from the open first end. The sensor assembly has a first sensor assembly end and a second sensor assembly end opposite the first sensor assembly end. The sensor assembly can be positioned within the housing as desired. For example, the sensor assembly may be positioned within the housing so that the first sensor assembly end generally aligns (or is level) with the open first end of the housing. Alternatively, for example, the sensor assembly may be positioned within the housing so that the second sensor assembly end is proximate the closed second end of the housing.

In some embodiments, at 704, a positioning clip (e.g. the positioning clip 130 shown in FIG. 1C) (which may also be referred to as a spacer) is used to position the sensor assembly as desired within the housing. In some embodiments, at 704, a spacer (e.g. the spacer 342 shown in FIG. 3B or spacer 1242 shown in FIG. 12) is used to position the sensor assembly as desired within the housing.

At 706, a substrate material is added to the housing. For example, the substrate material may be injected or poured into the housing from the open first end. The substrate material may comprise one or a combination of suitable substrate materials, e.g. epoxy, silicon, polyamide, polyester etc., whether transparent, translucent, or opaque.

In some embodiments, the substrate material is added to the housing, at 706, before the sensor assembly is positioned within housing, at 704. In such embodiments, the sensor assembly is at least partially submerged into the substrate material already within the housing.

At 708, the substrate material is hardened or cast. Optionally, at 708 the substrate material may be thermoformed. In such cases, the substrate material may comprise ethylene-vinyl acetate, polyurethanes, polyolefins, styrene block copolymers, or other suitable "hot melt adhesives". The duration of hardening process may vary based on the amount and type of substrate material added to the housing. For example, the hardening process may take 10 hours or less. Once the substrate material is hardened within the housing, it may be characterized as a "hardened substrate portion".

The hardened substrate portion at least partially encapsulates or surrounds the sensor assembly. As a result, the sensor assembly is positioned within the housing by the hardened substrate portion. Put alternatively, once the substrate material is hardened, at 708, the sensor assembly cannot move relative to the housing. In some cases, the sensor assembly may be nearly or fully encapsulated by the hardened substrate portion. As described above, the sensor assembly is protected by the hardened substrate portion. For example, the hardened substrate portion may act to waterproof the sensor assembly as well as protect it from shock, extreme temperatures, drops and/or corrosion.

Optionally, before adding the substrate material within the housing, at 706, the method further comprises, at 710, determining a quantity of the substrate material to add within the housing such that, after the substrate material is hardened, at 708, a weight of the sensor device approximates a combined weight of the container and the sample stored therein. If not provided, the combined weight of the container and the sample stored therein may be measured (e.g. by weighing on a scale). Once the combined weight of the container and the sample stored therein is determined, a suitable amount of the substrate material may be added to the housing so that the weight of the sensor device 100 approximates that combined weight. The weight of the sensor device is about 70 to 130% of the combined weight of the container and the sample stored therein. Optionally, the weight of the sensor device is about 90 to 110% of the combined weight of the container sample and the sample stored therein.

The substrate material optionally includes a filler or additive mixed therein to either increase or decrease a density of the hardened substrate material. Optionally, the substrate material and the filler are homogenously mixed. The filler may be added to adjust the density of the hardened substrate material so that the weight of the sensor device approximates the combined weight of the container and the sample stored therein. For example, at 710, determining a quantity of the substrate material may involve determining a relative proportion of the substrate material and the filler to add within the housing, so that after the hardening the substrate material, at 708, the weight of the sensor device approximates the combined weight of the container and the sample stored therein. In some cases, at 710, the substrate material and the filler are mixed together in relative quantities so that a density of the hardened substrate portion approximates a density of the sample (e.g. blood).

For example, the filler may be hollow glass-microspheres, plastic microspheres, silica or other suitable materials. In some cases, adding a filler to the substrate material to decrease the density of the hardened substrate material may allow the hardened substrate portion to occupy a greater volume within the housing. This may allow the hardened substrate portion to better protect and/or immobilize the sensor assembly.

The following is provided merely as an example of how a relative proportion of substrate material and filling can be determined, by setting a target parameter for one or more parameters described herein, such as weight, density etc. (target parameters can be readily set by a skilled person), and then adjusting proportions of the substrate material and filler and mixing the material and filler in order to achieve target parameters. For example, relative proportions are determined at 710, so that the weight of the sensor device approximates the combined weight of the container and the sample contained therein. The density of the substrate material (e.g. epoxy) is optionally 1180 kg/m$^3$ and the density of the filler (e.g. hollow glass microspheres) is optionally 380 kg/m$^3$. A target density of the harden substrate portion is optionally set at 900 kg/m$^3$. To achieve the target density, 5.75 parts substrate epoxy are mixed with 1 part hollow glass microspheres (by weight). A target weight of the sensor device is 16 grams (e.g. the combined weight of the container and the sample stored therein). A combined weight of the sensor assembly and housing is 10 grams. Therefore, the hardened substrate portion requires a weight of 6 grams [16 grams−10 grams=6 grams] in order for the weight of the sensor device 100 to approximate the target weight. Accordingly, approximately 6.67 mL of the above-noted mixture needs to be added within the housing [6 grams÷(900 kg/m$^3$× 1000 grams/kg)×10$^6$ mL/m$^3$=6.67 mL]. After hardening, the weight of the sensor device is approximately 16 grams.

Due to its configuration that generally matches the configuration of the containers and optionally its weight that approximates a combined weight of the container and the sample stored therein, when positioned proximate the container during transportation, the sensor device may detect at least one transport parameter analogous or comparable to that transport parameter experienced in the container.

The method 700 described above may be modified to make any one of the sensor devices 400, 500 and 600 shown in FIGS. 4, 5 and 6, respectively. At 702, instead of providing a housing with a configuration that generally matches the configuration of the container for storing a sample, a housing may be provided with a configuration (e.g. shape and/or size) that generally matches the configuration of a drug or food product (e.g. pills, capsules, tablets, candies and the like). Optionally, at 710, instead of determining a quantity of substrate material to add so that a weight of the sensor device approximates the weight of the container and the sample stored therein, a quantity of the substrate material is determined so that a weight of the sensor device approximates the weight of the drug or food product.

Figure 11:
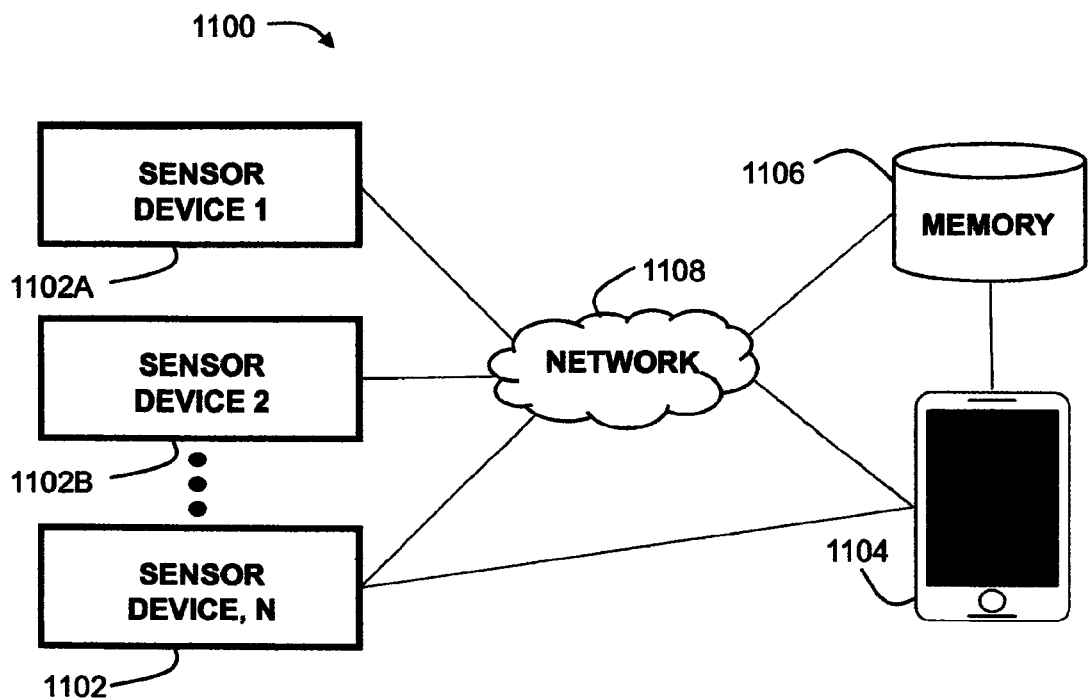
FIG. 11 is a block diagram displaying an exemplary system for tracking a sample over a transportation network.

Referring to FIG. 11, illustrated therein is a block diagram of an exemplary system 1100 for monitoring an item or object over a transportation network or during motion. The monitored object may be a sample (e.g. blood or urine) stored in a container (e.g. vial, test tube and the like) transported from one location to another or a drug or food product (e.g. pills, tablets, capsules, candy and the like) undergoing a coating or mixing process (e.g. on a conveyor belt or in a mixing drum).

The system 1100 includes at least one sensor device 1102. The at least one sensor device 1102 may be any one of the sensor devices 100, 200, 300, 400, 500, 600, or 1200 shown in FIGS. 1A-1D, 2A-2B, 3A-3B, 4, 5, 6, and 12 respectively, or a combination thereof. Although two sensor devices 1102A and 1102B are shown, fewer or more sensor devices 1102 may interact in the system 1100. The at least one sensor device 1102 may be positioned proximate to the object being monitored throughout transportation or motion. As described above, the at least one sensor device 1102 may have a housing with a configuration that generally matches the configuration of the object and optionally a weight that approximates the weight of the object. In this way, the at least one sensor device 1102 may detect at least one transport parameter (e.g. temperature, acceleration, orientation, etc.) similar or representative to that at least one transport parameter experienced by the objects during transportation or motion.

The at least one sensor device 1102 can interact with a memory or database 1106 directly or via a network 1108. The at least one sensor device 1102 can also interact with a computing device 1104 via the network 1108 or directly through a wired-connection. The at least one sensor device 1102 may be configured to transmit captured data to the memory 1106 via the network 1108. This captured data comprises at least one transport parameter (e.g. acceleration, temperature, etc.) detected by the at least one sensor device 1102 during transportation or motion. The memory 1106 can store data received from the at least one sensor device 1102. In some cases, the memory 1106 can include one or more storage devices located at a networked cloud storage provider.

Secondary storage may also be provided within the computing device 1104. Generally, the secondary storage may be any suitable storage device such as a hard disk drive, a solid state drive, a memory card, or a disk (e.g. CD, DVD, or Blu-ray etc.).

In some cases, the computing device 1104 can be locally connected with the at least one sensor device 1102. For example, after transportation or motion has ended, a cable may be used to connect the at least one sensor device and the computing device 1104 (e.g. USB cable connection). In other cases, the at least one sensor device 1102 may be located remotely from the computing device 1104 and accessible to computing device 1104 via the network 1108. In such cases, the at least one sensor device 1102 may be accessible to the computing device 1104 throughout the transportation or motion (i.e. in real-time).

The computing device 1104 may include at least a processor and memory, and may be an electronic tablet device, a personal computer, a workstation, a server, a portable computer, a mobile device, a personal digital assistant, a laptop, a smart phone, a WAP phone, an interactive television, a video display terminal, a gaming console, and a portable electronic device or any combination of these.

The computing device 1104 may include an input device for entering information and making requests. For example, the input device may be a keyboard, a keypad, a cursorcontrol device, a touch-screen, a camera, a microphone, or any combination of these. The computing device 1104 may further include a display device having a display screen for presenting visual information. For example, the display device may be a computer monitor, a flat-screen display, a projector, a display panel or any combination of these.

The processor of the computing device 1104 is configured to make requests to the memory 1106 and/or directly to the at least one sensor device 1102. For example, the request may be to retrieve the humidity and/or acceleration detected by the sensor device 1102A for a specific time period. This is provided merely as an example and it will be appreciated that many other requests can be made by the processor. Optionally, the retrieved data may be displayed on the display device of the computing device 1104.

The network 1108 may be any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the at least one sensor device 1102, computing device 1104, and the memory 1106.

As used herein, the wording "and/or" is intended to represent an inclusive- or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A device for detecting transport parameters representative of those experienced by a sample during transportation, the sample stored in a container, the device comprising:
- a housing with a configuration generally matching the configuration of the container;
- a hardened substrate portion formed from a substrate material; and
- a sensor assembly comprising at least one sensor for detecting at least one transport parameter, the sensor assembly being secured within the housing by the hardened substrate portion;
- wherein the device is positionable proximate the container during the transportation of the sample such that the at least one transport parameter detected by the at least one sensor is analogous to the at least one transport parameter experienced in the container.

Item 2: The device of any preceding item, wherein a weight of the device approximates a combined weight of the container and the sample stored therein.

Item 3: The device of any preceding item, wherein the weight of the device is about 80 to 120% of the combined weight of the container and the sample stored therein.

Item 4: The device of any preceding item, wherein the weight of the device is about 90 to 110% of the combined weight of the container and the sample stored therein.

Item 5: The device of any preceding item, wherein the weight of the device is adjusted during forming of the device by adjusting a weight of the hardened substrate portion.

Item 6: The device of any preceding item, wherein the substrate material portion comprises, consists essentially of, or consists of an epoxy.

Item 7: The device of any preceding item, wherein the substrate material comprises an epoxy and a filler, the weight of the hardened substrate portion being adjusted during forming of the device by varying the relative weight proportions of the epoxy and the filler.

Item 8: The device of any preceding item, wherein the filler comprises at least one of glass microspheres, plastic microspheres, and silica.

Item 9: The device of any preceding item, wherein the weight of the hardened substrate portion is adjusted during forming of the device by adjusting the density of the substrate material.

Item 10: The device of any preceding item, wherein the sensor assembly further comprises a controller and an energy storage module for energizing the controller, the controller being coupled to the at least one sensor.

Item 11: The device of any preceding item, wherein the sensor assembly further comprises a memory module coupled to the controller, the memory module being configured to store the at least one transport parameter detected by the at least one sensor.

Item 12: The device of any preceding item, wherein the at least one sensor comprises at least one of a 3-axis accelerometer, a 3-axis gyroscope, a 3-axis magnetometer, a light sensor, a humidity sensor, a temperature sensor, and a GPS tracker.

Item 13: The device of any preceding item, wherein the controller is configured to track real-time during transportation.

Item 14: The device of any preceding item, wherein the sensor assembly is couplable to a peripheral device.

Item 15: The device of any preceding item, wherein the sensor assembly is wirelessly couplable to the peripheral device.

Item 16: The device of any preceding item, wherein the sensor assembly further comprises a wireless transmitter configured to wirelessly couple the sensor assembly to the peripheral device.

Item 17: The device of any preceding item, wherein the wireless transmitter comprises at least one of a Wi-Fi module, a Bluetooth module, and a NFC module.

Item 18: The device of any preceding item, wherein the sensor assembly is couplable to the peripheral device through a wired-connection.

Item 19: The device of any preceding item, wherein
- the housing includes a first housing end and a second housing end opposite the first housing end;
- the sensor assembly includes a first sensor assembly end and a second sensor assembly end opposite the first sensor assembly end;

the sensor assembly being positioned within the housing such that the first sensor assembly end is proximate the first housing end.

Item 20: The device of any preceding item, wherein the sensor assembly further comprises a cap positioned at the first sensor assembly end, the cap having a cut-out portion defining a slot adapted to receive a cable for coupling the sensor assembly to a peripheral device.

Item 21: The device of any preceding item, further comprising a spacer positioned within the housing, wherein
the housing includes a first housing end and a second housing end opposite the first housing end;
the sensor assembly includes a first sensor assembly end and a second sensor assembly end opposite the first sensor assembly end;
the spacer being configured to space the second sensor assembly from the second housing end.

Item 22: The device of any preceding item, wherein the housing is generally tubular.

Item 23: The device of any preceding item, wherein the housing is generally vial-shaped.

Item 24: The device of any preceding item, wherein the at least one transport parameter is at least one of a temperature, a humidity, an acceleration, an orientation, a location, and a light intensity.

Item 25: The device of any preceding item, wherein the sensor assembly is at least partially embedded in the hardened substrate portion.

Item 26: The device of any preceding item, wherein the sensor assembly is fully embedded in the hardened substrate portion.

Item 27: The device of any preceding item, wherein the device is positionable proximate the container within a carrier.

Item 28: The device of any preceding item, wherein the carrier is a carrier used to transport samples in a pneumatic tube system (PTS).

Item 29: The device of any preceding item, wherein the housing is formed from a hardened substrate material, the housing being integrally formed with the hardened substrate portion and comprising the same substrate material.

Item 30: The device of any preceding item, wherein the housing is open at the first and closed and rounded at the second end.

Item 31: A system for monitoring a sample during transportation, the sample stored in a container, the system comprising:
at least one sensor device positionable proximate the container during the transportation of the sample, the at least one sensor device comprising:
a housing with a configuration generally matching the configuration of the container;
a hardened substrate portion formed from a substrate material; and
a sensor assembly comprising at least one sensor for detecting
at least one transport parameter during the transportation, the sensor assembly being fixedly secured within the housing by the hardened substrate portion;
a computing device couplable to the sensor assembly of the at least one sensor device, the computing device comprising at least a processor, the processor being configured to retrieve the at least one transport parameter detected by the at least one sensor when coupled to the sensor assembly.

Item 32: The system of any preceding item, where the computing device is located remotely from the at least one sensor device.

Item 33: The system of any preceding item, wherein the at least one sensor device and the computing device are coupled via a wireless network.

Item 34: The system of any preceding item further comprising a memory coupled to the computing device and the at least one sensor device via the wireless network, the memory configured to store the at least one transport parameter detected by the at least one sensor during the transportation.

Item 35: The system of any preceding item, wherein a weight of the at least one sensor device approximates a combined weight of the container and the sample stored therein.

Item 36: A method of making a device for detecting transport parameters representative of those experienced by a sample during transportation, the sample stored in a container, the device positionable proximate the container during the transportation, the method comprising:
providing a housing with a configuration that generally matches the configuration of the container;
positioning a sensor assembly within the housing, the sensor assembly comprising at least one sensor for detecting at least one transport parameter;
adding a substrate material within the housing; and
hardening the substrate material such that the sensor assembly is secured within the housing by the hardened substrate material.

Item 37: The method of any preceding item, wherein the method further comprises, before the step of adding a substrate material:
determining a quantity of the substrate material to add within the housing such that a weight of the device approximates a combined weight of the container and the sample stored therein.

Item 38: The method of any preceding item, wherein the substrate material comprises an epoxy and a filler, and the method further comprises, before the step of adding the substrate material:
determining and mixing relative proportions of the epoxy and the filler to add within the housing such that a weight the device approximates a combined weight of the container and the sample stored therein.

Item 39: The method of any preceding item, wherein
the housing comprises an first housing end and a second housing end opposite the first housing end;
the sensor assembly further comprises a first sensor assembly end and a second sensor assembly end opposite the first sensor assembly end; and
the step of positioning a sensor assembly comprises positioning the sensor assembly within the housing such that the first sensor assembly end is proximate the first housing end.

Item 40: The method of any preceding item, wherein the step of hardening the substrate material comprises thermoforming the substrate material.

Item 41: A device for detecting transport parameters experienced by the device during transportation of the device in a mixing, a coating and/or a conveying process together with a plurality of substantially similar objects, the device comprising:
a housing;
a hardened substrate portion formed from a substrate material; and a sensor assembly comprising at least one sensor for detecting at least one transport parameter, the sensor assembly being secured within the housing by the hardened substrate portion;

wherein the device is proximate some or all of the plurality of substantially similar objects during the transportation such that the device is subjected to device transport parameters similar to object transport parameters experienced by the plurality of substantially similar objects during the transportation.

Item 42: The device of any preceding item, wherein the housing has a configuration generally matching the configuration of at least one of the substantially similar objects.

Item 43: The device of any preceding item, wherein the sensor assembly measures the device transport parameters.

Item 44: The device of any preceding item, wherein the measured device transport parameters are representative or typical of the object transport parameters experienced by one or more of the objects during the object transport, though not representative of the object transport parameters experienced by any individual object.

Item 45: The device of any preceding item, wherein the substantially similar objects comprise substantially similar object sizes, object proportions, object densities and/or object weights.

Item 46: The device of any preceding item, wherein the device has substantially similar or substantially identical size, proportion, density and/or weight as the objects.

Item 47: The device of any preceding item, wherein the device has substantially similar or substantially identical size, proportion, density and/or weight as an average of the size, proportion, density and/or weight of one or more the objects.

Item 48: The device of any preceding item, wherein object is a coated drug product or a coated food product.

Item 49: The device of any preceding item, wherein the transportation of the object is transportation in a mixer or in a conveyor.

Item 50: The device of any preceding item, wherein the coated drug product is a pharmaceutical dosage form.

Item 51: The device of any preceding item, wherein the mixer is a mixing drum for coating pharmaceutical pills, capsules or tablets with a coating.

Item 52: A device for sensing transport parameters representative of those experienced by adjacent medical vials during transportation, the device comprising:
a housing extending longitudinally from a housing first end to a housing second end, the housing first end having an opening to a housing interior volume, the housing having a housing outer lateral diameter of 12.5 mm±0.5 mm or of 15.5 mm±0.5 mm;
a sensor assembly positioned inside the housing and adhesively coupled to the housing, the sensor assembly comprising at least one sensor for detecting at least one transport parameter, a memory storing data associated with readings taken periodically from the sensor over time, and a communications module for transmitting the data out of the device; and
a container cap that is removably connectable to the first housing end to hermetically seal the sensor assembly inside the housing.

Item 53: The device of any preceding item, wherein the container cap has a cap outer lateral diameter greater than the housing outer lateral diameter.

Item 54: The device of any preceding item, wherein the device has a total longitudinal length of between 95 mm and 115 mm when the container cap is connected to the first housing end.

Item 55: The device of any preceding item, wherein the device has a total longitudinal length of between 70 mm and 90 mm when the container cap is connected to the first housing end.

Item 56: The device of any preceding item, further comprising:
a spacer rigidly connected to the sensor assembly, the spacer surrounding the sensor assembly inside the housing, and the spacer being adhesively bonded to the housing,
wherein the container cap is removably connectable to the first housing end to hermetically seal the sensor assembly and the spacer inside the housing.

Item 57: The device of any preceding item, wherein:
the sensor assembly extends longitudinally from a sensor assembly first end to a sensor assembly second end, and
the spacer has a spacer first portion proximate the sensor assembly first end,
and a spacer second portion proximate the sensor assembly second end.

Item 58: The device of any preceding item, wherein:
each of the spacer first portion and the spacer second portion are adhesively bonded to the housing.

Item 59: The device of any preceding item, wherein:
the spacer is adhesively bonded to the housing by a hot melt adhesive.

Item 60: The device of any preceding item, wherein:
the spacer is adhesively bonded to the housing by a hardened substrate.

Item 61: The device of any preceding item, wherein:
the sensor assembly extends longitudinally from a sensor assembly first end to a sensor assembly second end, and
the sensor assembly first and second ends are located inside the housing interior volume.

Item 62: A device for sensing transport parameters representative of those experienced by adjacent medical vials during transportation, the device comprising:
a housing extending longitudinally from a housing first end to a housing second end, the housing first end having an opening to a housing interior volume, the housing having a housing outer lateral diameter of 12.5 mm±0.5 mm or of 15.5 mm±0.5 mm;
a sensor assembly positioned inside the housing and adhesively coupled to the housing, the sensor assembly comprising at least one sensor for detecting at least one transport parameter, a memory storing data associated with readings taken periodically from the sensor over time, a light, and a controller communicatively coupled to the light and the memory, the controller configured to activate the light in response to determining that the at least one transport parameter falls outside of a predetermined threshold value range; and
a container cap that is removably connectable to the first housing end to hermetically seal the sensor assembly inside the housing.

The invention claimed is:
1. A device for sensing transport parameters representative of those experienced by adjacent medical vials during transportation, the device comprising:
a housing extending longitudinally from a housing first end to a housing second end, the housing first end having an opening to a housing interior volume, the housing having a housing outer lateral diameter of 12.5 mm±0.5 mm or of 15.5 mm±0.5 mm;

a sensor assembly positioned inside the housing and coupled to the housing, the sensor assembly comprising at least one sensor for detecting at least one transport parameter, a memory storing data associated with readings taken periodically from the sensor over time, and a communications module for transmitting the data out of the device;

a spacer rigidly connected to the sensor assembly, the spacer at least partially surrounding the sensor assembly inside the housing; and a container cap that is removably connectable to the first housing end to hermetically seal the sensor assembly and the spacer inside the housing, wherein a weight of the device approximates a weight of a blood vial of the same size filled with a blood sample.

2. The device of claim 1, wherein the container cap has a cap outer lateral diameter greater than the housing outer lateral diameter.

3. The device of claim 1, wherein the device has a total longitudinal length of between 95 mm and 115 mm when the container cap is connected to the first housing end.

4. The device of claim 1, wherein the device has a total longitudinal length of between 70 mm and 90 mm when the container cap is connected to the first housing end.

5. The device of claim 4, wherein:

the sensor assembly extends longitudinally from a sensor assembly first end to a sensor assembly second end, and the spacer has a spacer first portion proximate the sensor assembly first end, and a spacer second portion proximate the sensor assembly second end.

6. The device of claim 5, wherein:

each of the spacer first portion and the spacer second portion are coupled to the housing.

7. The device of claim 1, wherein:

the spacer is adhesively bonded to the housing by a hardened substrate.

8. The device of claim 1, wherein:

the sensor assembly extends longitudinally from a sensor assembly first end to a sensor assembly second end, and the sensor assembly first and second ends are located inside the housing interior volume.

9. The device of claim 1, wherein the weight of the device is about 80 to 120% of the weight of the blood vial filled with the blood sample.

10. The device of claim 1, wherein the device further comprises a hardened substrate material located inside the housing, the hardened substrate material comprising an epoxy and a density-increasing filler, the density-increasing filler having a higher density than the epoxy.

11. The device of claim 1, wherein the sensor assembly further comprises a controller and an energy storage module for energizing the controller, the controller being coupled to the at least one sensor.

12. The device of claim 1, wherein the at least one sensor comprises at least one of a 3-axis accelerometer, a 3-axis gyroscope, a 3-axis magnetometer, a light sensor, a humidity sensor, a temperature sensor, and a GPS tracker.

13. The device of claim 11, wherein the controller is configured to track real-time during transportation.

14. The device of claim 1, wherein the sensor assembly is couplable to a peripheral device.

15. The device of claim 14, wherein the sensor assembly is wirelessly couplable to the peripheral device.

16. The device of claim 14, wherein the sensor assembly is couplable to the peripheral device through a wired-connection.

17. The device of claim 1, wherein the housing is generally vial-shaped.

18. The device of claim 1, wherein the at least one sensor comprises a 3-axis gyroscope.

19. The device of claim 1, wherein the spacer includes opposed first and second pieces that sandwich the sensor assembly therebetween.

20. The device of claim 1, wherein:

a) the housing interior volume has a capacity of 10 mL, and the weight of the device is about 19.2 g; or b) the housing interior volume has a capacity of 9 mL, and the weight of the device is about 18.5 g; or c) the housing interior volume has a capacity of 8 mL, and the weight of the device is about 17.1 g; or d) the housing interior volume has a capacity of 6 mL, and the weight of the device is about 13.2 g; or e) the housing interior volume has a capacity of 4 mL, and the weight of the device is about 10 g.

* * * * *